US012403059B1

(12) United States Patent
Thornton et al.

(10) Patent No.: US 12,403,059 B1
(45) Date of Patent: Sep. 2, 2025

(54) SYSTEMS AND METHODS FOR KNEE JOINT THERAPY

(71) Applicant: Xeras Medical Technologies, Inc., San Antonio, TX (US)

(72) Inventors: Ethan Thornton, Boerne, TX (US); Gary Frashier, Boerne, TX (US); Manuel Torres, New Braunfels, TX (US); Doran Edwards, Crossville, TN (US)

(73) Assignee: XERAS MEDICAL TECHNOLOGIES INC., San Antonio, TX (US)

( * ) Notice: Subject to any disclaimer, the term of this patent is extended or adjusted under 35 U.S.C. 154(b) by 103 days.

(21) Appl. No.: 18/236,843

(22) Filed: Aug. 22, 2023

Related U.S. Application Data

(60) Provisional application No. 63/399,938, filed on Aug. 22, 2022.

(51) Int. Cl.
*A61H 1/02* (2006.01)

(52) U.S. Cl.
CPC ...... *A61H 1/024* (2013.01); *A61H 2201/0119* (2013.01); *A61H 2201/0157* (2013.01); (Continued)

(58) Field of Classification Search
CPC ............ A61H 1/024; A61H 2201/0119; A61H 2201/0157; A61H 2201/0192; A61H 2201/1238; A61H 2201/1292; A61H 2201/1409; A61H 2201/164; A61H 2201/1676; A61H 2201/169; A61H 2201/5007; A61H 2201/5025; A61H 2201/5035; A61H 2201/5061; A61H 2201/5064; A61H 2201/5069; A61H 2201/5071; A61H 2203/045; A61H 2203/0456; A61H 1/0281; (Continued)

(56) References Cited

U.S. PATENT DOCUMENTS 2,671,143 A * 3/1954 Stelzer .................. H01H 37/70 337/348
2,695,800 A 11/1954 Soucy
(Continued)

FOREIGN PATENT DOCUMENTS

CN 2885222 Y 7/2007
WO WO2016157217 A2 10/2016
(Continued)

OTHER PUBLICATIONS

"Getting Back Out There," Trainer Rx, http://www.trainer-rx.com, Jun. 20, 2017 (7 pages).

*Primary Examiner* — Garrett K Atkinson
(74) *Attorney, Agent, or Firm* — Pizarro Allen PC

(57) ABSTRACT

A knee joint rehabilitation apparatus may include a support bar fixed to a height-adjustment bar, the support bar being configured to receive a knee joint posterior; a plurality of pads configured to removably mount to the support bar to adjust an effective outer diameter of the support bar; and a lower leg support connected to the height-adjustment bar, the lower leg support being mounted to the height-adjustment bar so as to allow for changes in an angular position between said lower leg support and said height-adjustment bar.

20 Claims, 20 Drawing Sheets

(52) U.S. Cl.

CPC ................ *A61H 2201/0192* (2013.01); *A61H 2201/1238* (2013.01); *A61H 2201/1292* (2013.01); *A61H 2201/1409* (2013.01); *A61H 2201/164* (2013.01); *A61H 2201/1676* (2013.01); *A61H 2201/169* (2013.01); *A61H 2201/5007* (2013.01); *A61H 2201/5025* (2013.01); *A61H 2201/5035* (2013.01); *A61H 2201/5061* (2013.01); *A61H 2201/5064* (2013.01); *A61H 2201/5069* (2013.01); *A61H 2201/5071* (2013.01); *A61H 2203/045* (2013.01); *A61H 2203/0456* (2013.01)

(58) Field of Classification Search

CPC .... A61H 2201/0184; A61H 2203/0431; A61H 2201/5097; A61H 2201/5046; A61H 2201/501; A61H 2201/018; A61H 2201/123; A61H 2201/1616; A61H 2201/1633; A61H 2201/1659; A61H 2201/1671; A61H 2205/06; A61H 2205/10; A61H 2201/0176; A61H 2201/1215; A61H 2201/1472; A61H 2201/1638; A61H 2201/0149; A61H 1/0237; A61H 1/0244; A61H 1/0274; A63B 21/00178; A63B 21/4035; A63B 21/0023; A63B 23/03508; A63B 23/1254; A63B 23/1263; A63B 23/1272; A63B 24/0087; A63B 21/00181; A63B 21/4017; A63B 21/4021; A63B 21/4049; A63B 21/4047; A63B 23/1245; A63B 2024/0093; A63B 2071/0072; A63B 2071/0081; A63B 2208/0233; A63B 2220/17; A63B 2220/24; A63B 2220/51; A63B 2225/20; A63B 2225/50

See application file for complete search history.

(56) References Cited

U.S. PATENT DOCUMENTS

| | | | | | |
|---|---|---|---|---|---|
| 2,819,873 | A | | 1/1958 | Pearne | |
| 3,060,926 | A | | 10/1962 | May | |
| 3,203,657 | A | | 8/1965 | Thompson | |
| 3,415,490 | A | | 12/1968 | Steele | |
| 3,602,492 | A | | 8/1971 | Petrie | |
| 3,717,144 | A | * | 2/1973 | Bimler | A63B 23/0417 602/23 |
| 4,492,354 | A | | 1/1985 | Rice | |
| 4,700,373 | A | * | 10/1987 | Miller | A61B 6/0421 378/177 |
| 4,844,454 | A | | 7/1989 | Rogers | |
| 5,025,802 | A | * | 6/1991 | Laico | A61G 13/12 606/241 |
| 5,074,549 | A | | 12/1991 | Harvey | |
| 5,190,513 | A | * | 3/1993 | Habing | A63B 23/0211 482/145 |
| 5,333,604 | A | * | 8/1994 | Green | A61H 1/0255 601/33 |
| 5,334,028 | A | | 8/1994 | Melligan | |
| 5,421,115 | A | | 6/1995 | Mckay | |
| 5,435,411 | A | | 7/1995 | Borgatti | |
| 5,509,894 | A | | 4/1996 | Mason | |
| 5,554,088 | A | | 9/1996 | Zlojutro | |
| 5,669,863 | A | | 9/1997 | Ho | |
| 5,722,627 | A | | 3/1998 | Hoshino | |
| 5,746,688 | A | * | 5/1998 | Prager | A63B 23/03541 482/130 |
| 5,871,457 | A | | 2/1999 | Swedberg | |
| 5,873,312 | A | | 2/1999 | Mauro-Vetter | |
| 5,878,453 | A | | 3/1999 | Stokes | |
| 5,935,050 | A | | 8/1999 | Shahan | |
| 5,957,869 | A | | 9/1999 | Caruso | |
| 5,971,902 | A | * | 10/1999 | Robertson | A61H 1/0292 601/24 |
| 6,001,051 | A | * | 12/1999 | Chuan-Pin | A63B 21/0552 482/142 |
| 6,030,352 | A | | 2/2000 | Paik | |
| 6,048,293 | A | * | 4/2000 | Lee | A63B 21/4035 482/57 |
| 6,095,319 | A | * | 8/2000 | Noniewicz | B25H 1/14 198/632 |
| D432,246 | S | | 10/2000 | Pestone | |
| 6,165,112 | A | | 12/2000 | Morris | |
| 6,238,320 | B1 | * | 5/2001 | Flanagan | A63B 3/00 482/130 |
| 6,254,517 | B1 | | 7/2001 | Kennedy | |
| 6,287,244 | B1 | * | 9/2001 | Boos | A63B 23/0233 482/145 |
| 6,309,330 | B1 | * | 10/2001 | Thornton | A63B 21/00047 482/907 |
| 6,371,894 | B1 | | 4/2002 | Hill | |
| 6,569,064 | B1 | | 5/2003 | Loane | |
| 6,991,591 | B1 | | 1/2006 | Tsatsouline | |
| 7,662,077 | B1 | | 2/2010 | Liu | |
| 7,695,416 | B2 | * | 4/2010 | Weiner | A61H 1/024 482/137 |
| 7,784,749 | B2 | | 8/2010 | Radermacher | |
| 8,012,047 | B2 | * | 9/2011 | Gamboa | A63B 69/00 473/445 |
| D666,014 | S | * | 8/2012 | Gruszynski | D6/353 |
| 8,425,343 | B1 | * | 4/2013 | Olmos | A63B 69/3621 473/274 |
| 8,646,731 | B2 | * | 2/2014 | Burles | F16L 3/16 144/287 |
| 9,498,399 | B1 | | 11/2016 | Juntunen | |
| 10,123,736 | B2 | * | 11/2018 | Malone | A63B 21/4039 |
| 10,661,117 | B2 | * | 5/2020 | Malone | A63B 21/40 |
| 2003/0130097 | A1 | * | 7/2003 | Harrison | A63B 23/0494 482/122 |
| 2003/0224880 | A1 | | 12/2003 | Hansberry | |
| 2004/0049135 | A1 | | 3/2004 | Callanan | |
| 2005/0012000 | A1 | | 1/2005 | Jones | |
| 2005/0159688 | A1 | * | 7/2005 | Sakamoto | A61H 15/0092 601/123 |
| 2006/0009336 | A1 | | 1/2006 | Millet | |
| 2006/0014614 | A1 | | 1/2006 | Szabo | |
| 2006/0217249 | A1 | * | 9/2006 | Webber | A63B 23/02 482/142 |
| 2007/0298883 | A1 | | 12/2007 | Feldman | |
| 2008/0058173 | A1 | | 3/2008 | Mattox | |
| 2008/0125959 | A1 | * | 5/2008 | Doherty | H04W 4/02 707/999.107 |
| 2008/0182730 | A1 | * | 7/2008 | Conley | A61H 1/0244 482/95 |
| 2009/0163837 | A1 | * | 6/2009 | Sanger | A61H 1/024 601/5 |
| 2009/0275447 | A1 | | 11/2009 | Fishman | |
| 2010/0234192 | A1 | * | 9/2010 | Oller, Jr. | A63B 21/4047 482/131 |
| 2010/0256537 | A1 | * | 10/2010 | Menga | B25J 9/0006 601/34 |
| 2011/0231995 | A1 | * | 9/2011 | Sedillo | A61B 6/0421 5/601 |
| 2012/0115693 | A1 | * | 5/2012 | Franques | A63B 23/0211 482/140 |
| 2013/0029814 | A1 | * | 1/2013 | D'Alessandro | A63B 23/0227 482/139 |
| 2013/0110013 | A1 | * | 5/2013 | Carlson | A61H 1/024 601/5 |
| 2013/0197403 | A1 | * | 8/2013 | Sevy | A63B 23/0494 601/5 |
| 2013/0211291 | A1 | | 8/2013 | Tran | |
| 2013/0211297 | A1 | * | 8/2013 | Method | A61H 1/0237 601/34 |
| 2013/0289448 | A1 | * | 10/2013 | Landry | A61B 5/11 600/595 |
| 2014/0038798 | A1 | * | 2/2014 | Littell | A63B 23/0211 482/145 |

(56) References Cited

U.S. PATENT DOCUMENTS

2014/0051556 A1* 2/2014 Abassian ........... A63B 22/0694 482/129
2014/0066271 A1* 3/2014 Gray .................. A63B 21/4031 482/131
2014/0073998 A1* 3/2014 Keiser .................... A61H 1/024 601/34
2014/0087929 A1 3/2014 Sussman
2014/0094721 A1* 4/2014 Diallo ................ A63B 24/0087 601/5
2014/0228186 A1* 8/2014 Montgomery ..... A63B 23/0494 482/139
2016/0279011 A1* 9/2016 Lutz ....................... A61H 1/024
2016/0367427 A1* 12/2016 Malone .................. A61H 1/024
2018/0169466 A1* 6/2018 Malone .............. A63B 23/0494

FOREIGN PATENT DOCUMENTS

WO WO2016195680 A1 12/2016
WO WO2003068129 8/2023

* cited by examiner

SYSTEMS AND METHODS FOR KNEE JOINT THERAPY

CROSS REFERENCE TO RELATED APPLICATIONS

This application claims priority to U.S. Provisional Patent Application No. 63/399,938 filed Aug. 22, 2022, titled "Systems and Methods for Knee Joint Therapy", the disclosure of which is herein fully incorporated by reference.

FIELD

This application relates generally to physical therapy systems and methods for treatment of a knee joint.

BACKGROUND

The anatomy of a knee joint includes three bones, namely, the femur (thighbone), the tibia (shinbone) and the patella (kneecap). The patella is located in front of the knee joint and provides partial protection for the anterior portion of the knee. The knee joint includes a number of ligaments. Collateral ligaments are located vertically on opposed parallel sides of the knee joint. The medial collateral ligament is located on the outer inside of the knee joint and links the femur and tibia. The lateral collateral ligament is located on the outer outside of the knee joint, and also links the femur and tibia. The purpose of the collateral ligaments is towards controlling knee joint sideways motion, thus fortifying the knee joint against unusual movement.

Cruciate ligaments are located inside of the knee joint and cross each other in the general form of an "X". The anterior cruciate ligament is located in front, behind the patella, and the posterior cruciate ligament is located in the back, linking the femur and tibia.

Upon completion of knee joint surgery or other type of knee joint treatment, such as knee joint replacement or replacement or repair of any torn or damaged previously described ligaments, bone fracture and bone fracture surgery, or internal fixation surgery, or for treatment of arthritic conditions, or meniscus repair, or for knee injury recovery, regaining normal knee joint flexibility, range of motion and strength typically requires a physical therapy rehabilitation program.

Following knee surgery, or arthritic treatment, or injury treatment, or other procedure or course of treatment for the knee joint, physical therapy may be beneficially applied toward restoring full and painless motion of the knee joint, along with re-establishing associated ligament and muscle suppleness. Restoration may be followed by a knee joint strengthening program focused on regaining normal function of the knee joint. A physical therapy program progressively stretches muscle(s) and tendon(s) to their former flexibility. A final rehabilitation phase encourages complete return of normal knee joint functionality.

There remains a need for a system and method for a knee joint flexion and extension support allowing for incrementally-applied physical therapy.

SUMMARY

In some embodiments, a knee joint rehabilitation apparatus may include a support bar fixed to a height-adjustment bar, the support bar being configured to receive a knee joint posterior; a plurality of pads configured to removably mount to the support bar to adjust an effective outer diameter of the support bar; and a lower leg support connected to the height-adjustment bar, the lower leg support being mounted to the height-adjustment bar so as to allow for changes in an angular position between said lower leg support and said height-adjustment bar It is an objective of some embodiments herein to provide a knee joint rehabilitation device configured for knee joint flexion and to allow a patient's knee joint to progress through different levels of flexion using gravity assisted therapeutic methods. To progress through different stages or levels of therapy, a support bar and system of pads may be used with the patient's leg extended over the support bar. With the leg disposed on the support bar, the physical therapist may allow gravity to pull the lower leg downwards through a range of motion to help stretch the knee joint tissues. The lower leg may effectively serve as a lever, with the femur and patient's body weight at a knee side of a fulcrum point serving as an anchor weight. The gravity force serves to gently distract the knee joint, thus allowing the knee joint to separate and stretch substantially without creating compressive forces in the joint. In some embodiments, at least a portion of the weight of the patient's leg may be supported by a lower leg support. The lower leg support may, for example, be slowly adjusted in position so that a decreasing proportion of the weight of the patient's leg is supported thereby. This may, for example, allow a patient to transition between incremental levels of knee joint flexion more gently.

BRIEF DESCRIPTION OF THE DRAWINGS

As shown in FIG. 18, the knee joint flexion apparatus may include a handheld control for controlling the position of a lower leg support.

DETAILED DESCRIPTION

Figure 1:
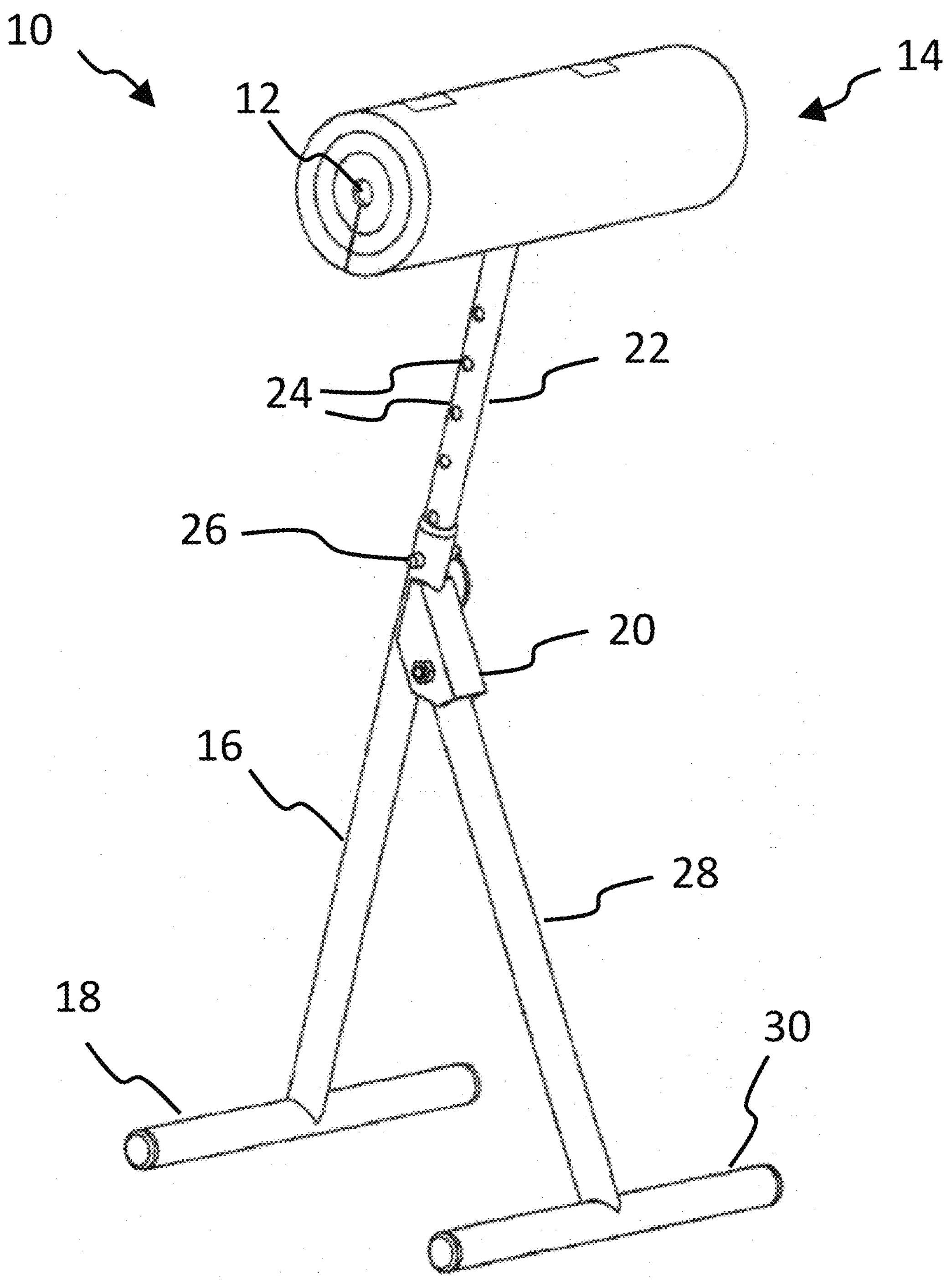
FIG. 1 is a perspective view of an embodiment of a knee joint rehabilitation device or apparatus.

The following terms as used herein should be understood to have the indicated meanings unless the context requires otherwise.

When an item is introduced by “a” or “an,” it should be understood to mean one or more of that item.

“Comprises” means includes but is not limited to.

“Comprising” means including but not limited to.

The term “effective outer diameter” of a support bar refers to the diameter of the support bar when considering any padding or other material around the component. For example, the effective outer diameter of a support bar includes the diameter of the support bar (e.g., the width of material through the center of the bar) adjusted for the thickness of one or more pads disposed about the support bar.

“Having” means including but not limited to.

A “hinge” means a joint that allows rotation of at least one of the components connected by the hinge with respect to the other.

A “joint” may include any connection that permits movement of the components connected by the joint with respect to one another. For example, a joint may provide for rotational, hinged, or pivotable motion between the components connected to one another by the joint. By way of example, a joint may include one or more pin connections, rod and sleeve connections, ball and socket connections, or the like.

Disclosed herein are knee joint rehabilitation systems and methods adapted for knee joint rehabilitation following knee joint surgery or other type of knee joint treatments, such as knee joint replacement, replacement or repair of any torn or damaged knee ligaments, bone fracture and bone fracture surgery, internal fixation surgery, meniscus repair, treatment of arthritic conditions, knee injury recovery, regaining normal knee joint flexibility, and range of motion and strength recovery. The systems and methods may be used for reducing muscle spasm, pain, and swelling. The systems and methods may involve use of devices configured to provide and track appropriate flexion and extension support of the posterior intersection concerning the femur and tibia of anon-operative, arthritic, injured, fractured, or post-operative recovering knee joint, and to promote deliberate gravity assisted passive flexion and extension towards gradual knee joint muscle and tendon stretching, and mechanical decompression of the knee joint to alleviate pain, pressure, swelling, and general discomfort.

A knee joint rehabilitation system may comprise a knee joint flexion device or apparatus including a support bar configured for supporting the patient’s knee and promoting bending of the patient’s knee about a controlled angle when the knee is positioned over the support bar and the patient’s leg is allowed to hang over the support bar to facilitate passive gravity-assisted stretching of the knee joint. The knee joint flexion device may include a system of pads configured for nesting inside one another and mounting to a support bar to adjust the effective diameter of the support bar and control the angle about which a patient’s knee may bend. Alternatively, a plurality of support bars and/or pads may be used to provide different support bar effective diameters. Adjustment of the effective diameter of the support bar may facilitate incremental knee flexion during an individual’s progression though a physical therapy regimen. Physical therapy regimens and methods making use of support bars with different effective diameters are described more fully herein including in reference to FIGS. 16, 17, and 19, for example. Some of the pads which may be used to provide different effective diameters of support bars and which may be included in or used with the knee flexion devices and methods described herein are also disclosed in U.S. Pat. No. 9,962,311 entitled “Method and Apparatus for Knee Joint Flexibility Rehabilitation,” and in US Patent Application Publication No. 20180169466 entitled “Method and Apparatus for Variable Knee Flexion Support,” the entire disclosures of which are incorporated herein by reference.

Figure 2:
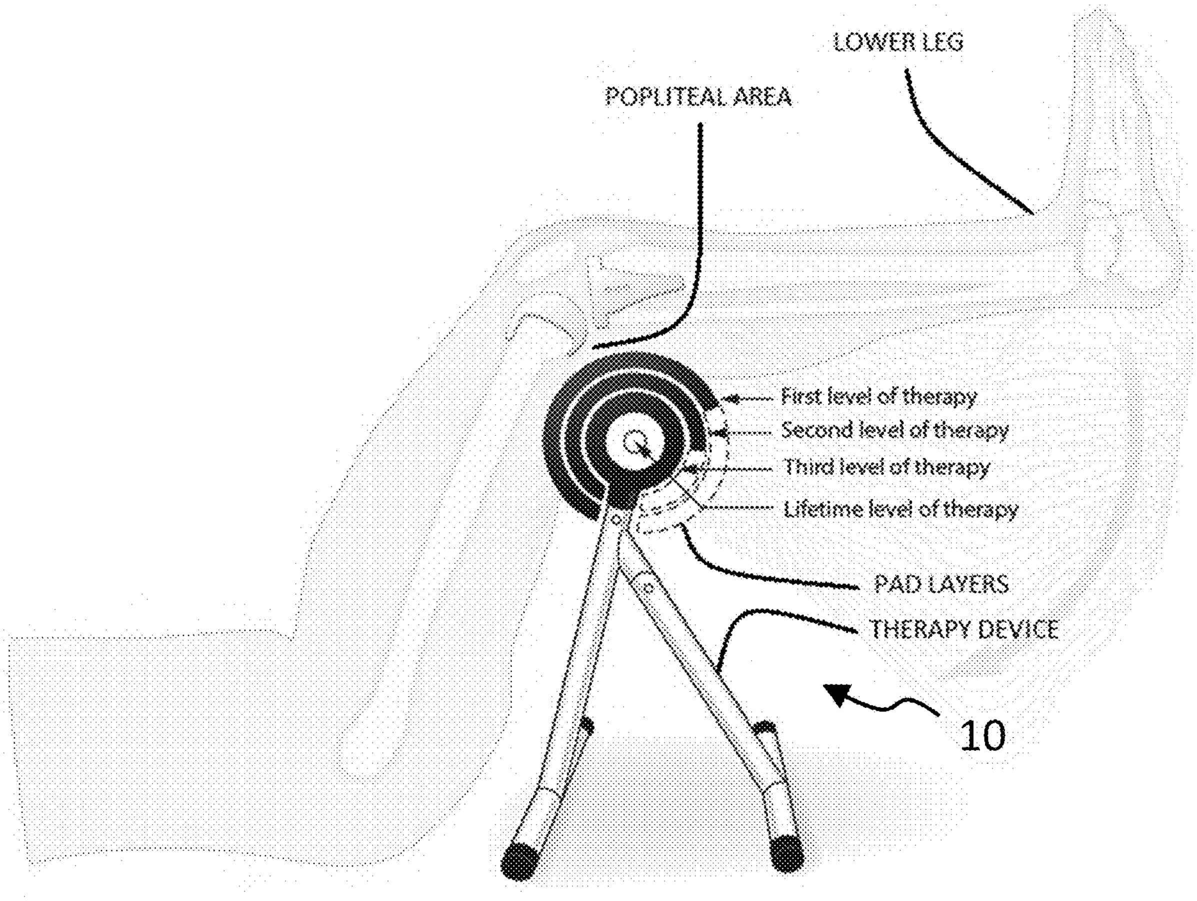
FIG. 2 is a schematic view showing a user's knee positioned on the knee joint rehabilitation device of FIG. 1.

For example, FIG. 1 shows one embodiment of a knee joint flexion device 10. The knee joint flexion device 10 may be provided to a user in any of various forms of assembly. For example, the knee joint flexion device 10 may be provided in a fully assembled form or with one or more of the following components in a disassembled form and including instructions for assembly. The knee joint flexion device 10 includes a support bar 12 and a system of pads 14 useful for supporting a patient’s knee. The system of pads 14 may, for example, include a plurality of pads configured for nesting inside one another and mounting to the support bar 12 to adjust the effective diameter of the support bar. The knee joint flexion device 10 may further include a tubular strut 16 having a first support foot 18 and a bracket 20 attached thereto. The height-adjustment bar 22 may be translatably or translatably and rotatably disposed in the tubular strut 16. For example, the height-adjustment bar 22 may fit into an aperture formed in the tubular strut 16 so that the height-adjustment bar may translate vertically within the tubular strut. The height-adjustment bar 22 may include a plurality of apertures 24 extending through the cross-section of the height-adjustment bar. A pin 26 may be affixed to the tubular strut 16 and configured for coupling with a selected one of the plurality of apertures 24 to secure the height-adjustment bar 22 in a selected position. The support bar 12 may be connected to the height-adjustment bar. For example, the support bar 12 may be fixedly disposed substantially perpendicularly to the height-adjustment bar 22. In some embodiments, the support bar 12 may be removably coupled to the height-adjustment bar. One or more pads among the system of pads 14 may be disposed thereon to provide a given effective diameter among a group of available effective diameters and to receive a knee joint posterior more comfortably, as shown in FIG. 2, for example. To vary the effective diameter or incrementally change the effective diameter of the support bar, one or more of the pads may be added or removed. A support strut 28 may be pivotably connected to the bracket 20, the support strut 28 having a second support foot 30 attached thereto. The support strut 28 may be pivotably connected to the bracket 20 so that it may be positioned away from parallel to the tubular strut 16 to form an angle thereto and to provide stable support for device operation.

Figure 18:
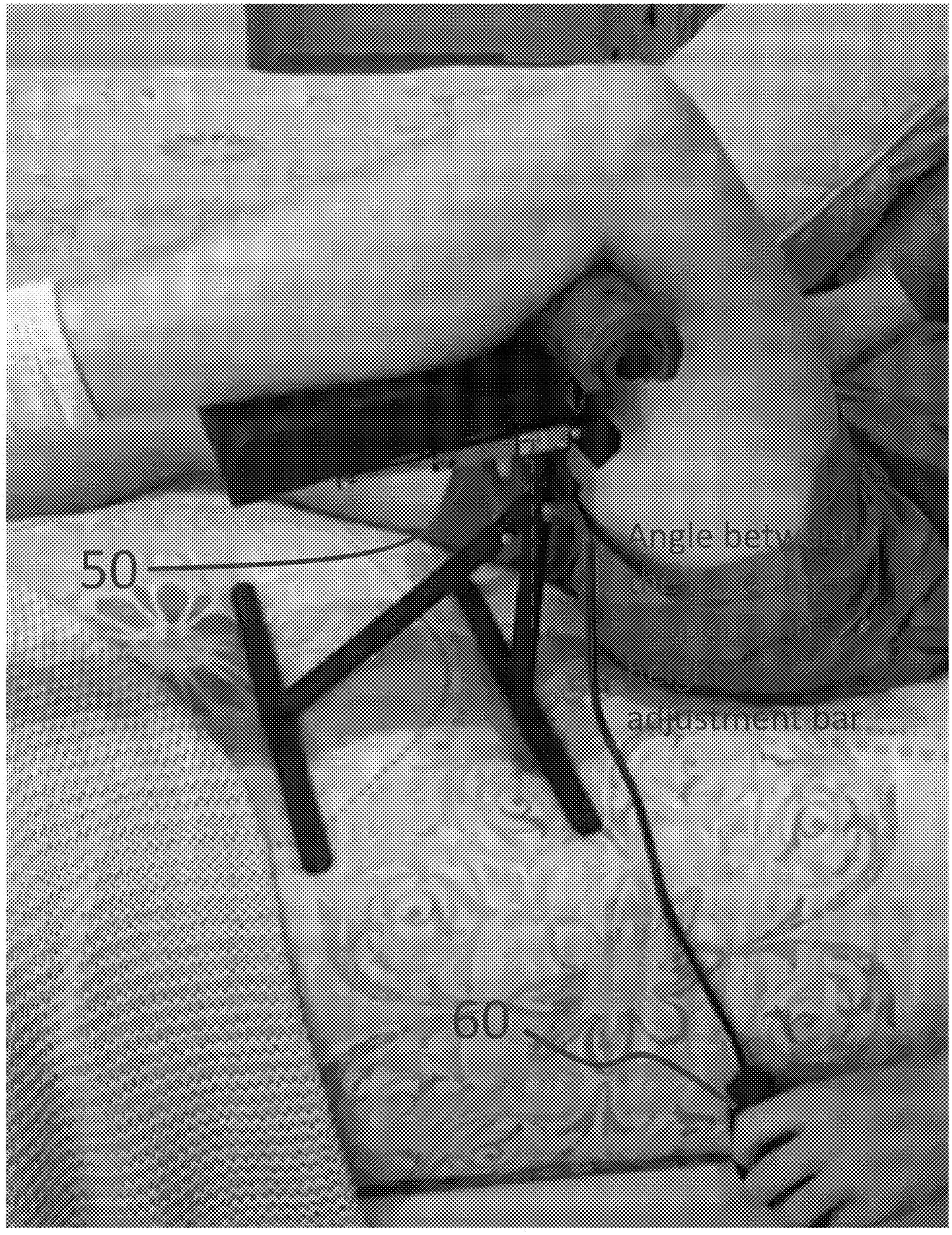
FIG. 18 is a picture of an individual using a knee joint flexion device or apparatus, the apparatus shown in a first position.

Another embodiment of a knee joint flexion device 100 is shown in FIGS. 3-6. As shown therein, the knee joint flexion device 100 may include the height-adjustment bar 22. The height-adjustment bar may again be translatably or translatably and rotatably disposed in the tubular strut 16, as similarly described for the flexion device 10. Tubular strut 16 may, for example, be supported using a support foot 18 and support strut 28. In other embodiments, the height-adjustment bar 22 may be adjustably supported in a vertical orientation in a different way. The flexion device 100 may comprise a lower leg support 32. Lower leg support 32 may help to support a patient's leg when the patient's leg is extended over the support bar 12, thereby reducing pressure upon anatomical structures of the patient's knee, including, for example, anatomical structures adjacent to the popliteal fossa of the patient's knee. The lower leg support 32 may, for example, be connected to the height-adjustment bar 22 at a joint 44 so that the position of the lower leg support may be adjustable. The joint 44 may, for example, include a pivot 41. The pivot 41 may, for example, be positioned adjacent but slightly offset from the support bar 12. In some embodiments, as shown in FIG. 18, a knee joint flexion device may be provided with a controller 60 configured for use with one or more actuators 50, 52. The controller 60 may, for example, comprise a device sized and/or shaped for handheld grasping with one or more buttons, knobs, triggers, switches, or other attachments disposed thereon for controlling extension and retraction of the one or more actuators 50, 52. Extension or retraction of the one or more actuators 50, 52 may be used to rotate the lower leg support 32 about a hinge or other joint so as to adjust the relative position or angle of the lower leg support 32. For example, extension or retraction of the one or more actuators 50, 52 may be used to rotate the lower leg support 32 about a hinge or other joint so as to provide for adjustment of a relative angle between the lower leg support 32 and the height-adjustment bar 22. Thus, in some embodiments, a position of the lower leg support 32 with respect to the height-adjustment bar 22 may be controlled to provide for stronger or weaker engagement with the patient's leg and to support more or less of a weight of the patient's leg. For example, in some embodiments, lower leg support 32 may be controlled to ease a patient between stages in a therapeutic regimen. For example, more or less of the weight of the patient's leg may be supported by the lower leg support 32 when an individual is transitioning from one stage in a therapeutic regimen associated with a first effective diameter of the support bar 12 to a next stage in the therapeutic regimen associated with a second effective diameter of the support bar.

Figure 3:
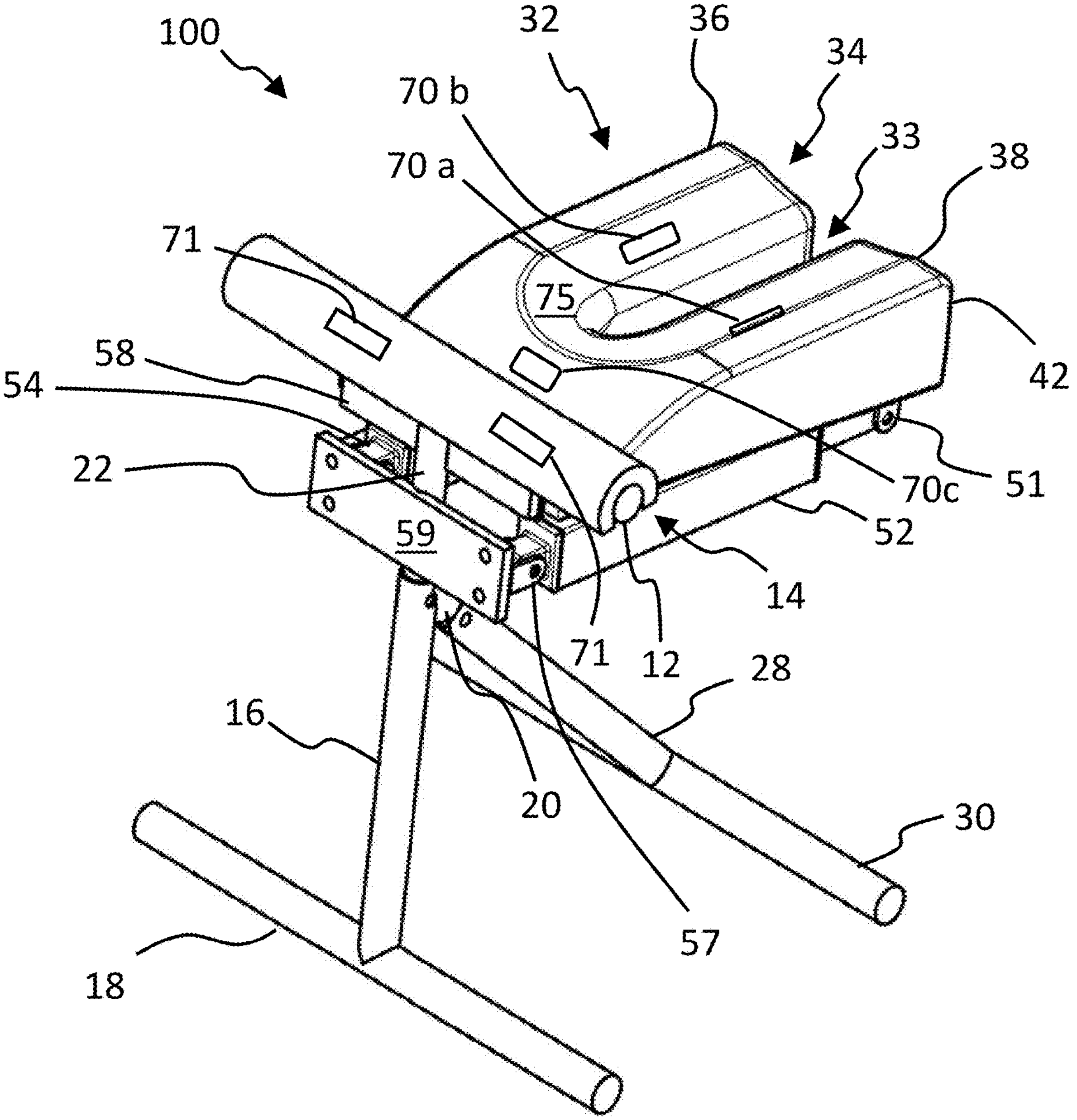
FIG. 3 is a perspective view of another embodiment of a knee joint rehabilitation device which includes a lower leg support.
Figure 4:
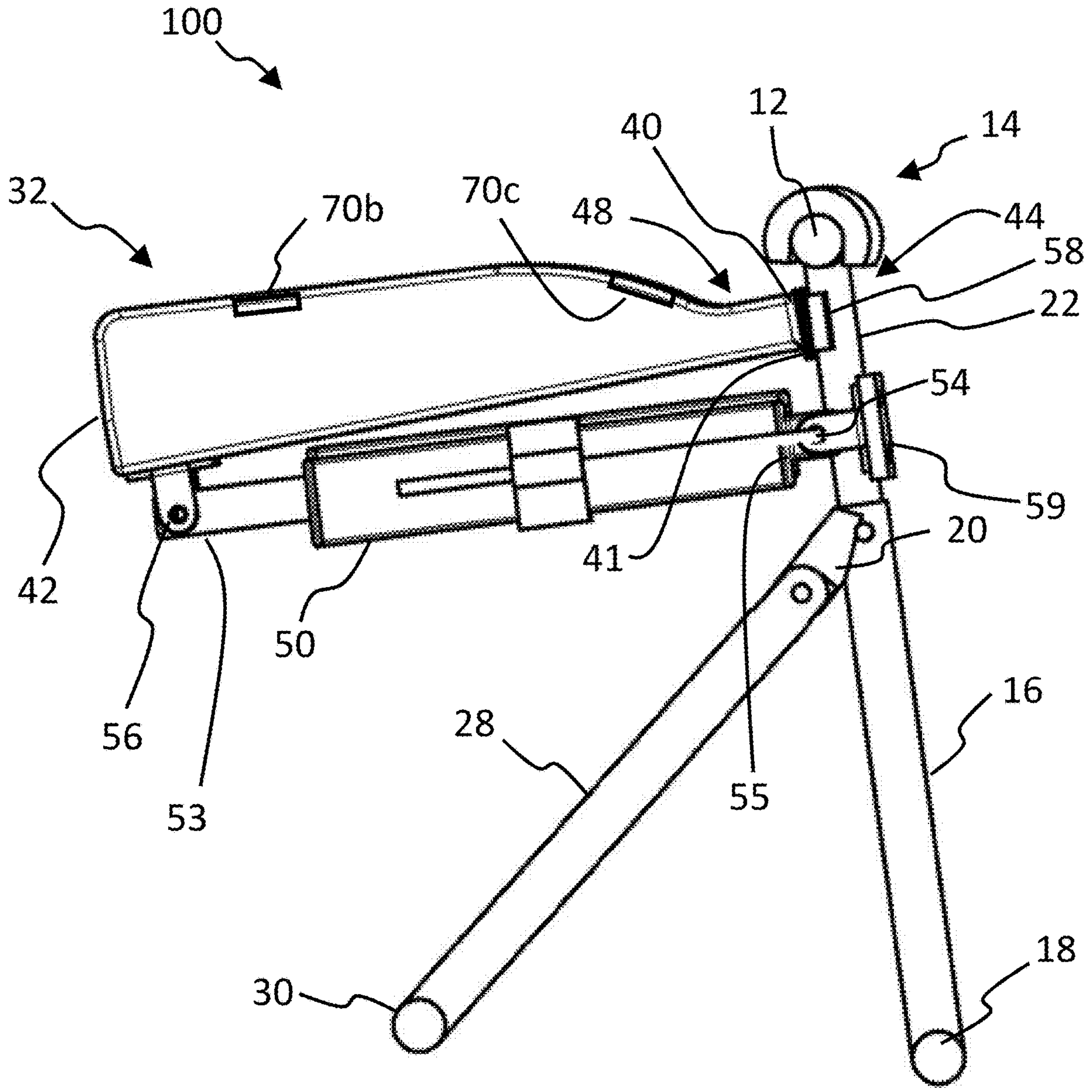
FIG. 4 is a side view of the knee joint rehabilitation device of FIG. 3.
Figure 5:
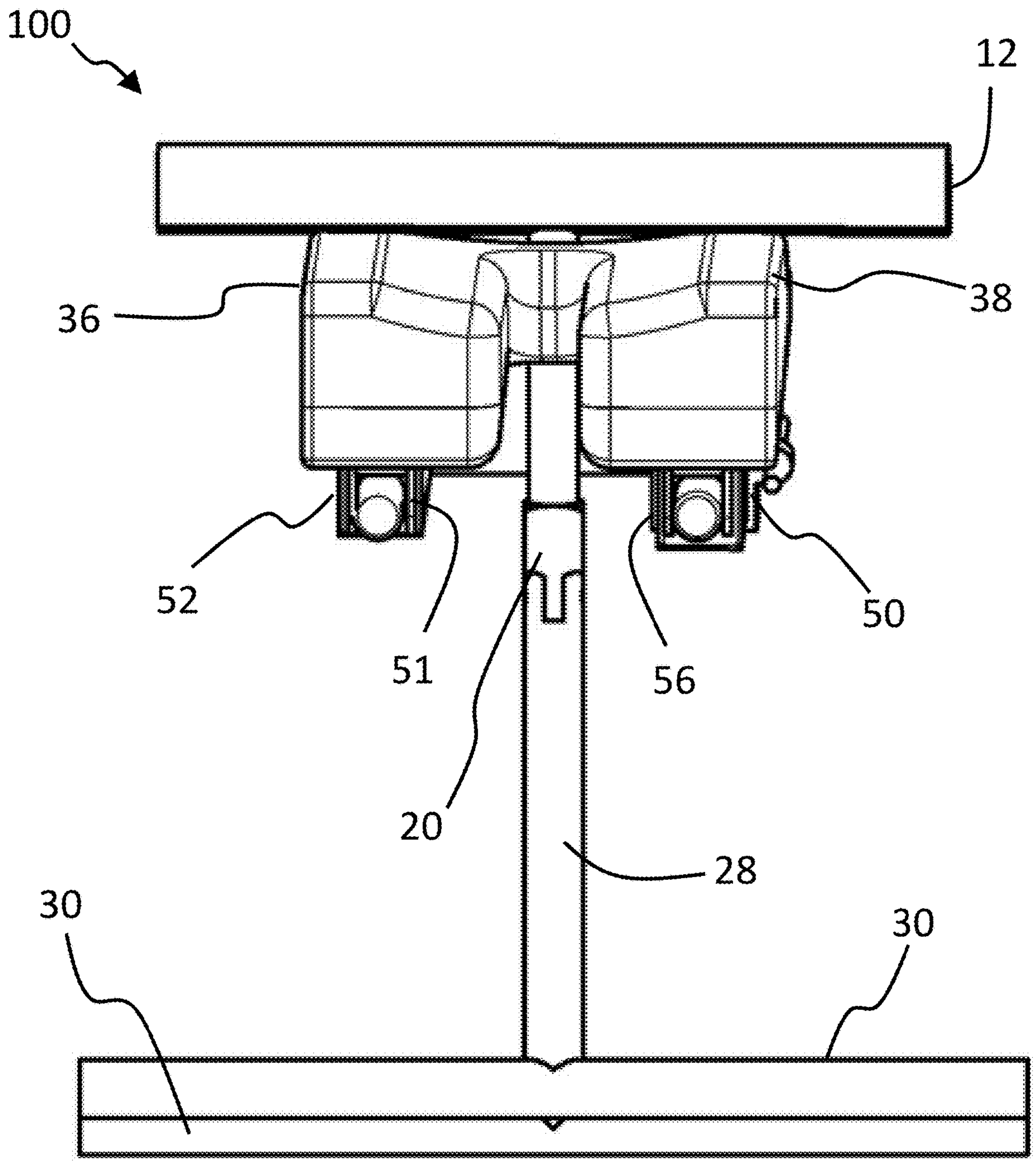
FIG. 5 is a front view of the knee joint rehabilitation device of FIG. 3.
Figure 6:
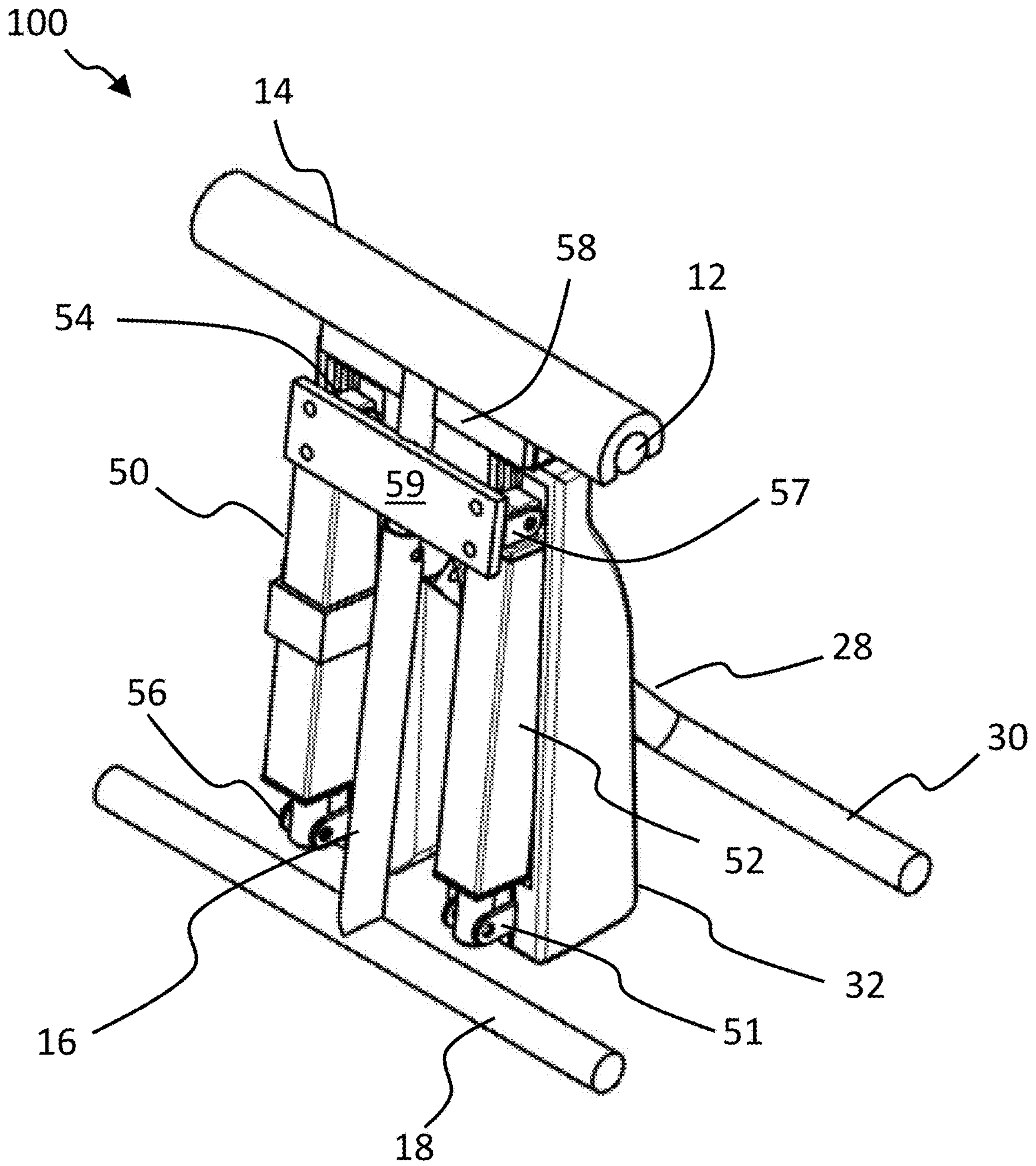
FIG. 6 is a perspective view of the knee joint rehabilitation device of FIG. 3 with a lower leg support shown in a stowed position.

In some embodiments, as shown in FIGS. 3 and 4, the lower leg support 32 may comprise a shaped pack or panel (e.g., a panel with associated padding disposed thereon) including a first recess or groove 34 for accepting a posterior portion of the patient's leg. The lower leg support 32 may further include a notch or opening 33 formed therein. The recess or groove 34 may be formed within a gap between a left-side wall or ridge 36 and a right-side wall or ridge 38 of the lower leg support 32. Lower leg support 32 further includes a first end 40 and a second end 42 distal from the first end. In some embodiments, the lower leg support 32 may generally increase in thickness along at least along a portion of the length of the lower leg support 32 running from the first end 40 to the second end 42. In this configuration, a second recess or groove 48 may be formed adjacent to the first end 40 of the lower leg support 32 in the space between the padded support bar 12 and the lower leg support 32. The second recess or groove 48 may run about perpendicular to the first recess or groove 34. The lower leg support 32 may, for example, comprise a top surface 75 contoured to comfortably receive the patient's calf muscle.

The configuration of the lower leg support 32 (e.g., the surface shape, size, and position of the grooves 34, 48) may help to support the patient's lower leg more fully and allow the patient's leg to be more comfortably received within the grooves as the lower leg support is moved through different angular positions. In some embodiments, the shape of the lower leg support 32 and positioning of one or more force or pressure sensors 70*a*, 70*b*, and 70*c* disposed thereon may help to provide reliable contact between the patient's leg and at least one of the sensors 70*a*, 70*b*, and 70*c* so that reliable sensor signals may be obtained for different angular positions of the lower leg support 32. To that point, lower leg support 32 may be connected to the height-adjustment bar 22 using the joint 44, wherein the joint may be positioned on the height-adjustment bar 22 and spaced apart from the support bar 12. The joint 44 may comprise the pivot 41. The relative position between the joint 44 and the support bar 12 may be useful because it allows a user to add or take away one or more pads from the system of pads 14 more easily (e.g., without having the connecting joint 44 interfere with addition or removal of pads from the support bar 12). For example, in some embodiments, the joint 44 may be offset from the support bar 12 by about 3 inches to about 6 inches or by some other suitable distance. However, with positioning of the joint 44 and associated pivot 41 at a distance below the support bar 12, the pivot is also spaced significantly apart from the knee joint of a patient when the patient's knee is supported by the support bar 12. In this geometry, the resting position of the patient's leg on atop surface 75 of the lower leg support 32 becomes dependent upon the flexion angle. In other words, because the patient's leg and the lower leg support 32 are rotated about different pivots (e.g., the pivot of the patient's knee and pivot 41 of the hinge 44) that are spaced apart from each other, the patient's leg may slide along the top surface 75 of the lower leg support when it is adjusted.

Figure 20:
FIG. 20 is a picture of an individual using a knee flexion therapeutic apparatus showing a second position of the knee joint flexion device or apparatus shown in FIG. 18.

For example, as shown in reference to FIGS. 18 and 20, for some patients, including some patients with significant calf musculature, a patient's calf may seat significantly within the groove 48, particularly at higher angles of flexion. However, at lesser angles of flexion, the patient's leg may be urged slightly forward so that the patient's leg is seated more fully in the groove 34. In the embodiment shown in FIGS. 3-6, the shape of the lower leg support 32 in combination with the positioning of forward-facing sensors 70*a*, 70*b* and more rearward facing sensors 70*c* helps to comfortably support the patient's leg and helps to guarantee that the patient's leg is in proper contact with at least one sensor throughout different flexion angles. In some embodiments, a lower leg support 32 may be provided with two grooves 34, 48 wherein at least one force or pressure sensor 70*a*, 70*b*, is generally positioned in the first groove 34 and at least one other force or pressure sensor 70*c* is positioned in the second groove 48.

The first end 40 of the lower leg support 32 may be connected to the joint 44 so that the lower leg support may be hingedly or pivotably disposed with respect to the height-adjustment bar 22. The joint 44 may, for example, comprise one or more pin connections, a rod and sleeve connection, or a ball and socket connection. In some embodiments, the joint 44 may comprise a plate 58 that is secured (e.g., bolted, screwed, welded, or secured using other suitable means) to the height-adjustment bar 22. For example, the plate 58 may be secured to the height-adjustment bar 22 using one or more bolts or screws or using a weldment. The plate 58 may comprise a first leaf of a pair of leaves of the joint 44 (which is a hinge in this example) through which a knuckle is formed. A pin may extend through the knuckle so that a second leaf among the pair of leaves may rotate about the pin (e.g., so that it pivots away from the plate 58). The second leaf of the hinge may, for example, be secured to the first end 40 of the lower leg support 32 so that the lower leg support 32 moves about the joint 44.

As described above, in some embodiments, a position of the lower leg support 32 may be changed using one or more actuators 50, 52, such as may be controlled using a controller 60 (shown in FIG. 18, for example). In some embodiments, one or more of the actuators 50, 52 may be configured for receiving a signal from the controller 60 to initiate actuation thereof and adjust the lower leg support 32. For example, the actuators 50, 52 may be linked to the controller 60 using a wired or wireless connection and may include components (e.g., a processing unit and related circuitry) for processing commands sent therebetween. In some embodiments, the control system may include a unit of memory which may be useful in providing a capability to store one or more programs including one or more routines suitable for controlling the lower leg support 32 in a predetermined or preselected way. In some embodiments, a controller may run a program or application useful for controlling the position of the lower leg support 32. Such an application may, for example, be downloaded or updated from a website. In some embodiments, the actuators 50, 52 may be controlled using a separate standalone computer, such as may directly control the actuators 50, 52 or control actuation thereof through the controller 60. The controller 60 may comprise a single button or switch adjustable between various settings, including, a first setting for raising the lower leg support and a second setting for lowering the lower leg support. In some embodiments, the controller 60 may be configured for receiving a preselected input such as a digital setting of an angular position between the lower leg support 32 and the height-adjustment bar 22. In another embodiment, the controller 60 may be equipped with a rotating knob such as may be turned to adjust a position for the lower leg support 32. A computer may, for example, be configured for running a program or application useful for controlling the position of the lower leg support 32.

In the illustrated embodiment, the lower leg support 32 may be connected to a pair of actuators 50, 52. The actuators 50, 52 may, for example, comprise a cylinder barrel and an associated piston rod extendable and retractable therefrom. The actuators 50, 52 may be pneumatic, hydraulic, mechanical, electrical, or of another suitable type. The actuators 50, 52 may, for example, operate pneumatically, hydraulically, electrically, mechanically, or using another suitable source of energy. Actuator 50 (which may also be referred to as the left-side actuator) is shown in FIG. 4. Actuator 52 (which may also be referred to as the right-side actuator) is disposed behind the actuator 50 so that it is not shown in FIG. 4. Right-side actuator 52 is shown in the perspective view of FIG. 3. Both the left-side and right-side actuators 50, 52 can be viewed together in FIG. 5, which shows a front view of the knee joint flexion device 100. Each of the actuators 50, 52 includes a first end and a second end. With reference to FIG. 4, left-side actuator 50 includes first end 53 and second end 55. Left-side actuator 50 is pivotably connected to the lower leg support 32 via the joint 56 at first end 53. Right-side actuator 52 is similarly connected to the lower leg support 32 via the joint 51. The actuators 50, 52 may further be connected to the height-adjustment bar 22 though a connecting bracket 59. Connecting bracket 59 may be secured to the height-adjustment bar 22 using any suitable structure or means such as a screw, bolt, or weldment for example. Right-side actuator 52 may be pivotably connected to the height-adjustment bar 22 through the connecting bracket 59 at joint 57. Left-side actuator 50 may be pivotably connected to the height-adjustment bar 22 through the connecting bracket 59 at joint 54.

As shown in FIG. 3, in some embodiments, the knee joint flexion device 100 may include one or more sensors. For example, the sensors 70*a*, 70*b*, 70*c* may be disposed on the lower leg support 32 and configured for collecting force or pressure data useful for guiding and/or tracking patient progress and compliance with a prescribed therapy regimen. One or more additional sensors 71 may further be provided as may be used, for example, in detection of contact between a patient's knee and the support bar 12. For example, in the embodiment shown in FIGS. 3-6, a pair of sensors 71 are included on an outermost pad mounted on the support bar. Methods of guiding and/or tracking patient progress and compliance with a prescribed therapy regimen which, may, in some embodiments, make use of one or more of the sensors 70*a*, 70*b*, 70*c*, and 71 are further described herein, including, in relation to method 240 shown in FIG. 19, for example. In some embodiments, one or more of the sensors 70*a*, 70*b*, 70*c*, and 71 may comprise a unit of memory configured for storing collected sensor data. The stored data may, for example, be accessed when the data is downloaded or otherwise accessed for review. In some embodiments, one or more of the sensors 70*a*, 70*b*, 70*c*, and 71 may comprise a transmitter or transceiver so that information may be transmitted from the sensors to one or more of controller 60 or a separate computer system 90. In some of those embodiments, data may be collected and used in real time in one or more routines used for controlling a position of the lower leg support 32. For example, as described in methods 200 and 240 (shown in FIGS. 16 and 19), in some therapeutic procedures described herein, a level of engagement or disengagement of the lower leg support 32 from a patient's leg may be determined using collected sensor data, which may, in some embodiments, be then used in setting or adjusting a position of the lower leg support.

Figure 7:
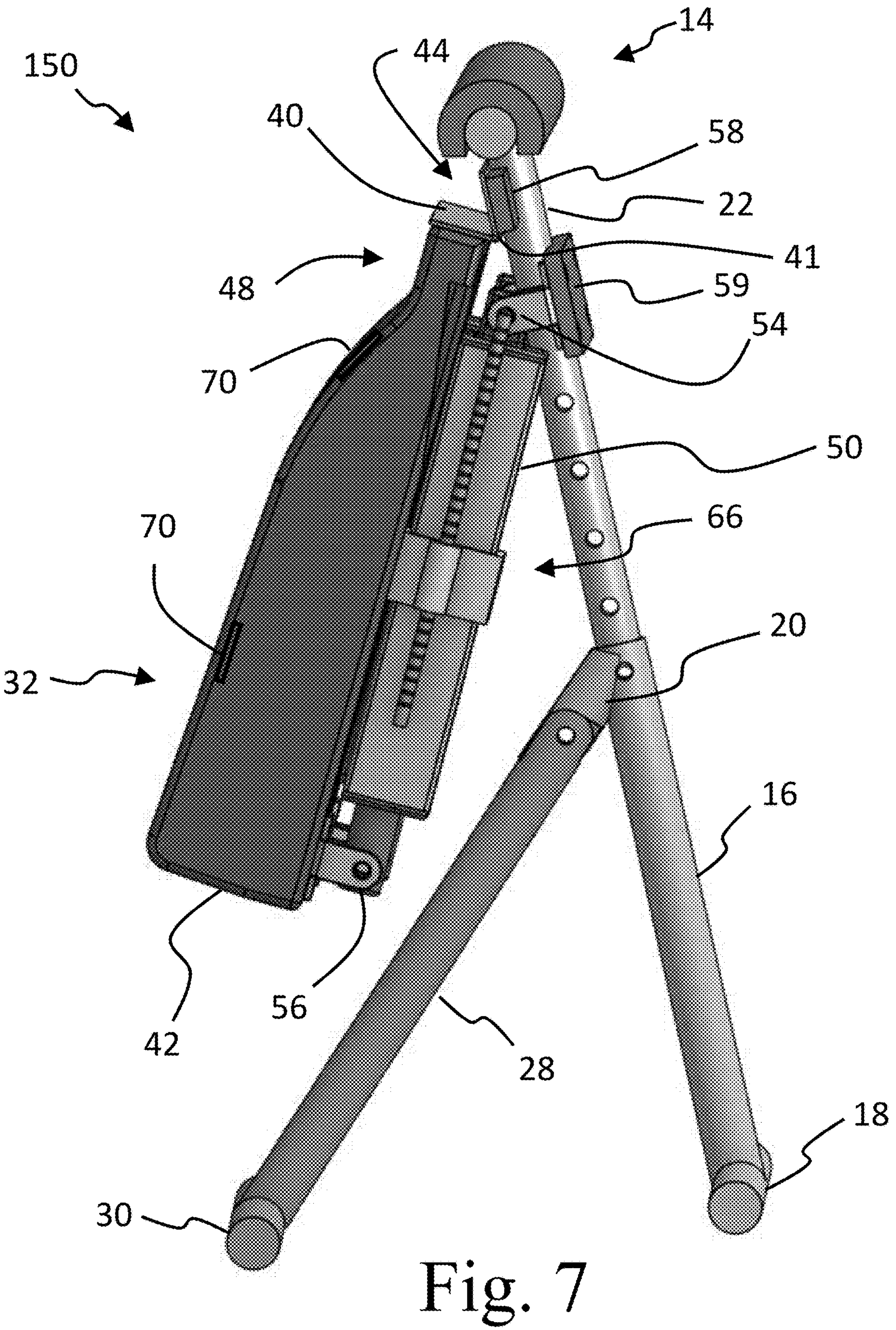
FIG. 7 is a perspective view of another embodiment of a knee joint rehabilitation device including a lower leg support and including a goniometer or angle guide.
Figure 8:
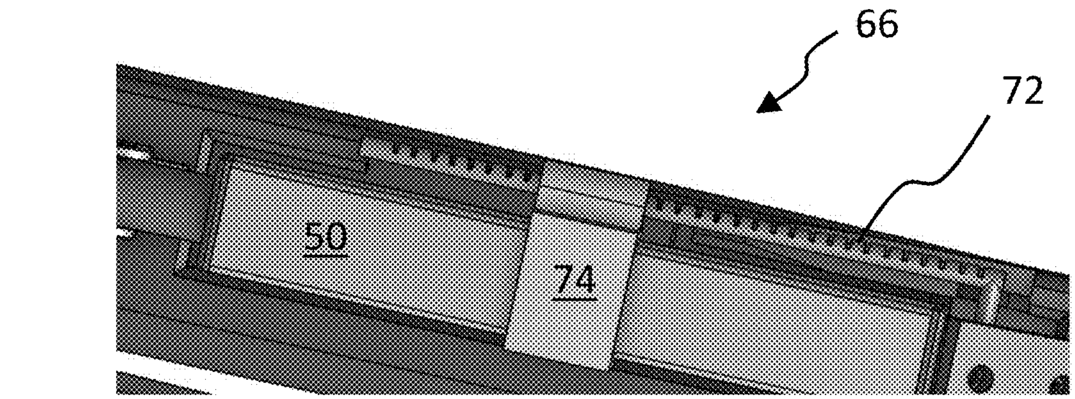
FIG. 8 is a closeup view of the knee joint rehabilitation device shown in FIG. 7 showing an angle guide or goniometer.
Figure 9:
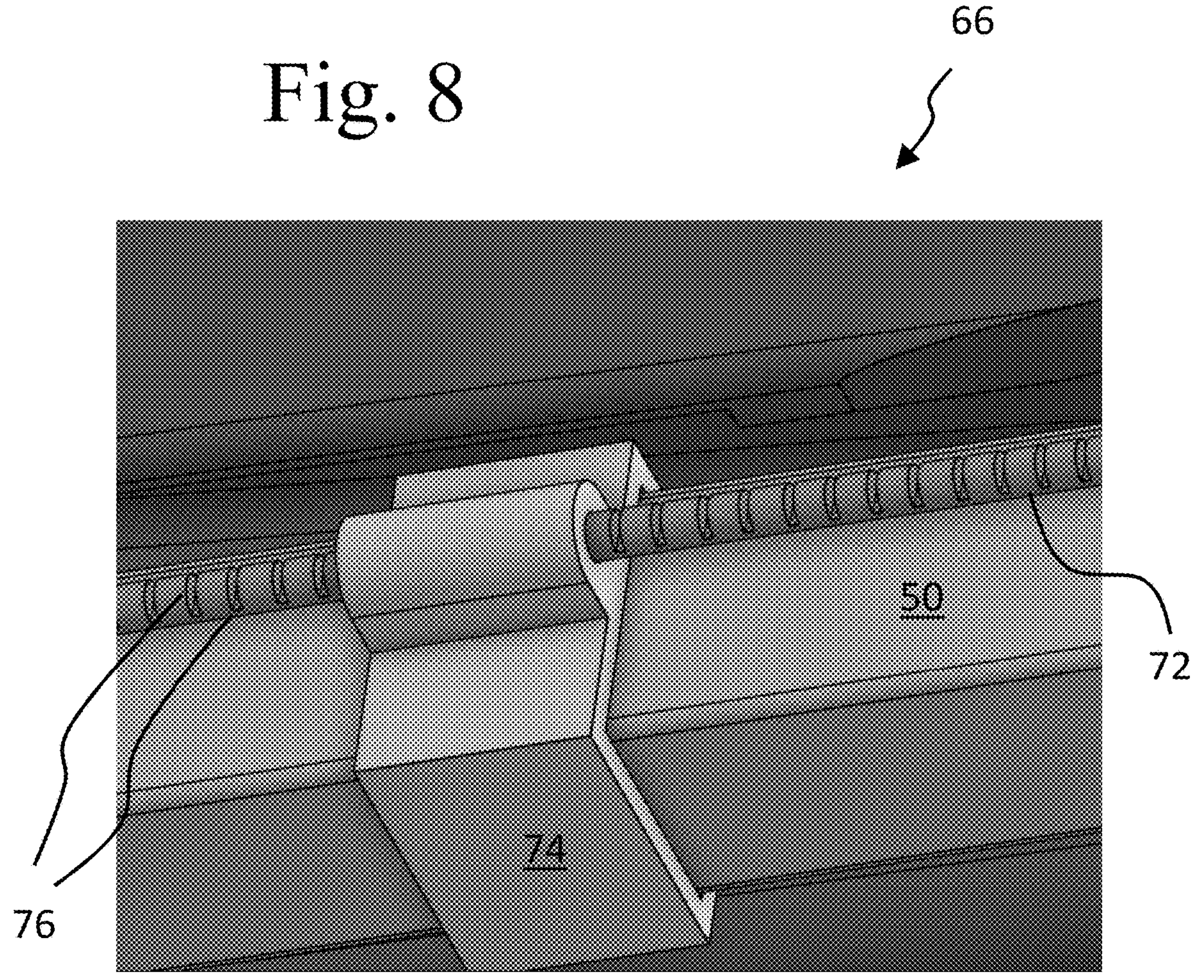
FIG. 9 is another closeup view of the knee joint rehabilitation device shown in FIG. 7 showing the angle guide or goniometer in perspective.

Another embodiment of a knee joint flexion device 150 is shown in FIGS. 7-9. As shown therein, the knee joint flexion device 150 may comprise an angle guide or goniometer 66. The goniometer 66 may, for example, be used to collect data facilitating reproducible adjustment of the lower leg support 32 and/or used for recording of the position of the lower leg support position during a therapeutic regimen. With reference to FIGS. 8 and 9, the angle guide or goniometer 66 may comprise a rod 72 and a sleeve 74, such as may be slidably engaged with each other. The rod 72 may comprise markers 76 in the form of notches, for example. A user may manually read the position of the sleeve 74 against the markers 76 to record a relative position between the rod 72 and the sleeve. This measurement may be correlated with a given angle between the lower leg support 32 and the height-adjustment bar 22. For example, in one embodiment, the markers 76 may be calibrated so that they directly indicate a relative angle between the lower leg support 32 and the height-adjustment bar 22.

In some embodiments, a knee joint flexion device may be configured for automatic adjustment of the lower leg support 32 to a desired position. This may, for example, make use of data collected with the goniometer 66 or with another suitable goniometer described herein. For example, one or more goniometers may be disposed at one or more joints between any two of the lower leg support, height-adjustment bar, and at least one of the actuators 50, 52. In one example, goniometer 66 may be configured to automatically record the relative position of the lower leg support 32 through an electromechanical coupling between the rod 72 and sleeve 74. In one such embodiment, the rod 72 may include one or more sensors disposed therein configured for detection of a magnetic field. For example, the rod 72 may include one or more hall sensors or other components configured for detection of a magnetic field. The sleeve 74 may include a magnet so that when the sleeve 74 and rod 72 move against each other, changes in relative position between the sleeve and rod may be detected using the sensors. Alternatively, one or more goniometers may be coupled to one or more of the joints 44, 54, 56. For example, an electromechanical goniometer disposed at one or more of the joints 44, 54, 56 may comprise a potentiometer rotationally mounted therein. The goniometers may provide a signal comprising data for the angular position of the lower leg support 32. In some embodiments, the actuators 50, 52 may be configured to receive a signal indicative of an angular position so that the lower leg support 32 may be automatically adjusted to a selected angular position, such as a position previously recorded in a previous session of a therapeutic regimen. This may be executed through data transmission involving the actuators 50, 52 and one or more of controller 60 and a standalone computer, for example.

Figure 10:
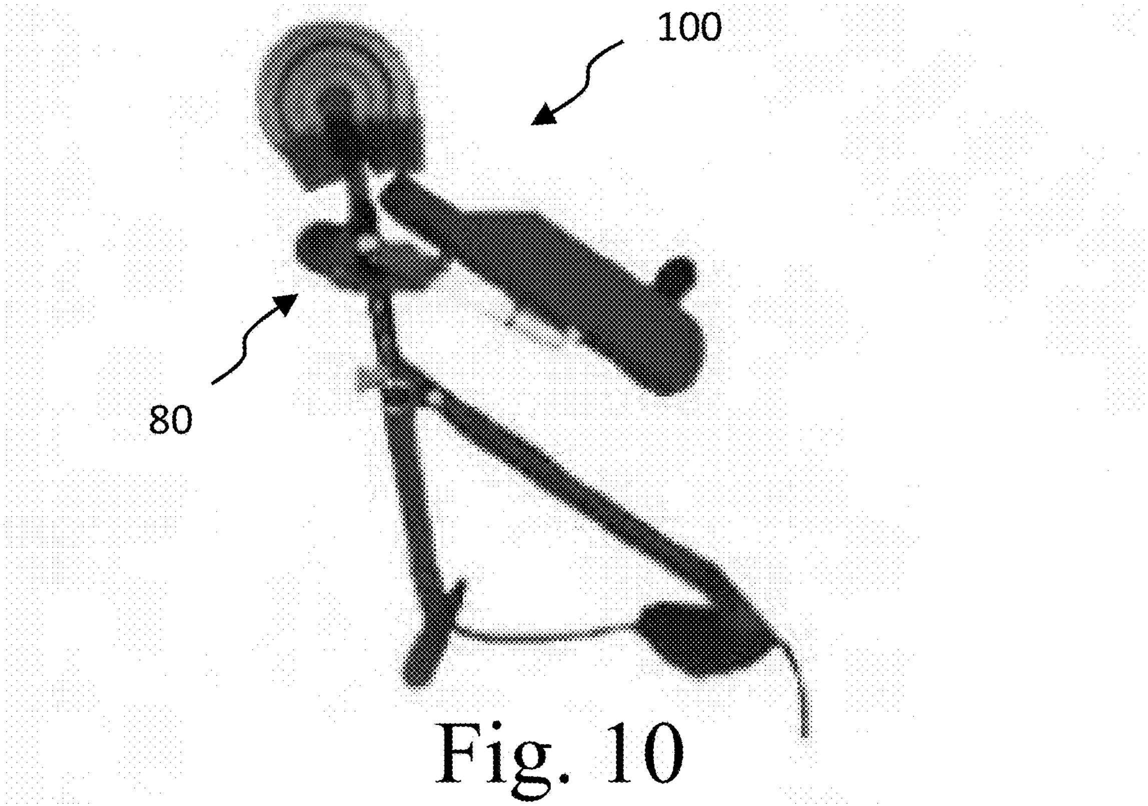
FIG. 10 is a picture of another embodiment of a knee joint rehabilitation device.
Figure 11:
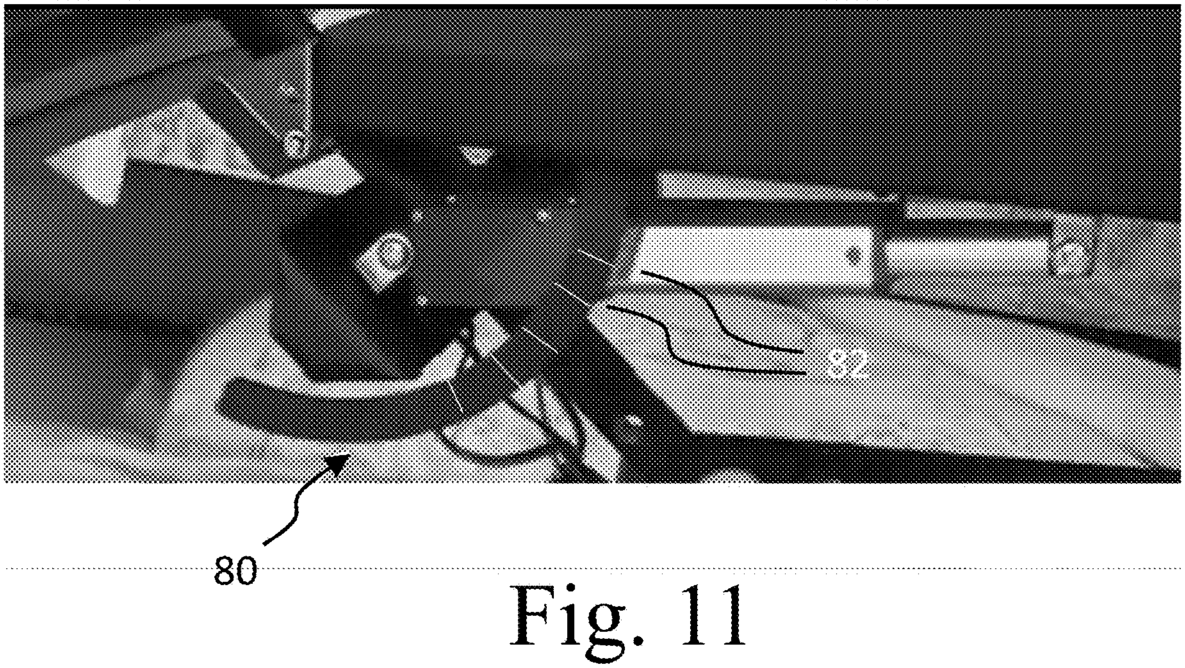
FIG. 11 is a picture of a closeup view of an angle guide or goniometer included on the knee joint rehabilitation device of FIG. 10

Another embodiment of an angle guide or goniometer 80 is shown in FIGS. 10 and 11. As shown therein, in some embodiments, knee joint flexion device 100 may include an angle guide or goniometer 80. Goniometer 80 may include markings 82 allowing a user to manually record a position (e.g., a position calibrated in degrees or relative units with respect to a height-adjustment bar) of the lower leg support 32. Alternatively, an electromechanical type of goniometer may be included in a knee joint flexion device.

Referring again to FIG. 2 and with further reference to FIGS. 12-15, a knee joint flexion device 10, 100, 150 as described herein may be used in a knee rehabilitation therapy regimen. When an individual is using a knee joint flexion device 10, 100, 150 the support bar 12 may be placed at the popliteal fossa of the knee. Such placement naturally results in the application of pressure to sensitive biological structures that are located in or traverse the fossa. Some such structures are, but not limited to, the tibial nerve, popliteal nerve, popliteal artery, small saphenous vein, common peroneal nerve, popliteal lymph nodes, and Dharmy vessels. This pressure may be attenuated using a pad or system of pads 14 as described above. The system of pads 14 may help to distribute and reduce pressure on these structures as compared, for example, to use of an exposed hard support bar, such as a metal or plastic bar. Accordingly, the time a particular pad of a therapeutic regime may be reasonably used may be increased.

Placement of the support bar 12 at the popliteal fossa permits the knee joint to "expand" to various degrees depending on the effective diameter of the support bar when a patient hangs the knee over the support bar. Such joint expansion beneficially promotes knee joint flexibility, particularly when the knee joint is progressively treated using pads of different diameter as described herein. For example, as the strength and flexibility of a knee joint for a given patient improves the patient may choose to transition from a first level of therapy associated with a first effective diameter of the support bar to a second level of therapy associated with a second effective diameter of the support bar.

By varying the effective diameter of the support bar 12 through various support bar diameters or by addition or removal of pad layers from the system of pads 14 a physical therapist (or patient, or doctor or other caregiver, as the case may be) may allow therapy to progress through each layer or pad support size based on the patient's therapeutic requirements throughout the course of a series of therapy sessions constituting a knee rehabilitation therapy regimen, thus better allowing for a patient-specific recovery regimen. Such requirements may include the level of flexion intended for a particular session based on patient comfort level and therapy goals for the session. Other requirements or needs defined in a therapeutic regimen may, for example, include a level of support provided by a lower leg support, time spent in a routine wherein the patient's leg was supported by a lower leg support, and a time spent at a given level of knee flexion. A system may provide a plurality of pads or support bar diameters having dimensions suitable for allowing various increments between ranges of motion. An embodiment suitable for treating a wide range of knee therapy patients comprises a set of four nested pads; however, the number of pads to be included may vary according to the treatment regimen and patient condition. The number of pads should allow for a variation of effective diameter of the support bar as added or subtracted and thus result in the therapy regime allowing for a variation in range of motion at the knee as the lower leg is rotated about the support bar. Some patients may require starting physical therapy at a larger (or much smaller) effective diameter than other patients, and so the number of pads may be adjusted accordingly. Furthermore, the number of pads may be inversely proportional to their thickness; that is, fewer thick pads may be used where larger range-of-motion increments may be beneficially used, or more thin pads may be used where smaller range-of-motion increments may be beneficially used.

In various embodiments, the pad layers 6, 7, 8, and 9 may incrementally increase the diameter of the support bar 12 to allow a physical therapist a method of incrementally increasing a patient's knee flexion. Although four pad diameters are shown in the exemplary staring configuration of pads for a therapeutic routine shown in FIG. 12, any suitable number or range of diameters may be used. For example, a post-operative patient may have limited range of motion in a knee 13, which may allow only a relatively large angle between the femur 15 and tibia 17. For such a patient, a plurality of layers may be used to increase the effective diameter of the support bar 12 so as to better support a knee during the first sessions of a knee therapy regimen wherein each layer of pad may correspond to an angle of flexion a at the knee joint to be achieved between the upper and lower segments of limb. For example, a first pad layer 6 may correspond to a flexion of approximately 90°, a second pad layer 7 to a flexion of approximately 105°, a third pad layer 8 to a flexion of approximately 120°, a fourth pad layer 9 to a flexion of approximately 135°, and so forth. Thus, in some embodiments, pad thickness and diameter may provide angles of flexion in 15° increments; however, other increments may be used. For example, a patient with flexion of only 80° may use the first pad layer 6 to achieve flexion of 90°, and then transition to use of the second pad layer 7 to achieve flexion of approximately 105°.

Figure 12:
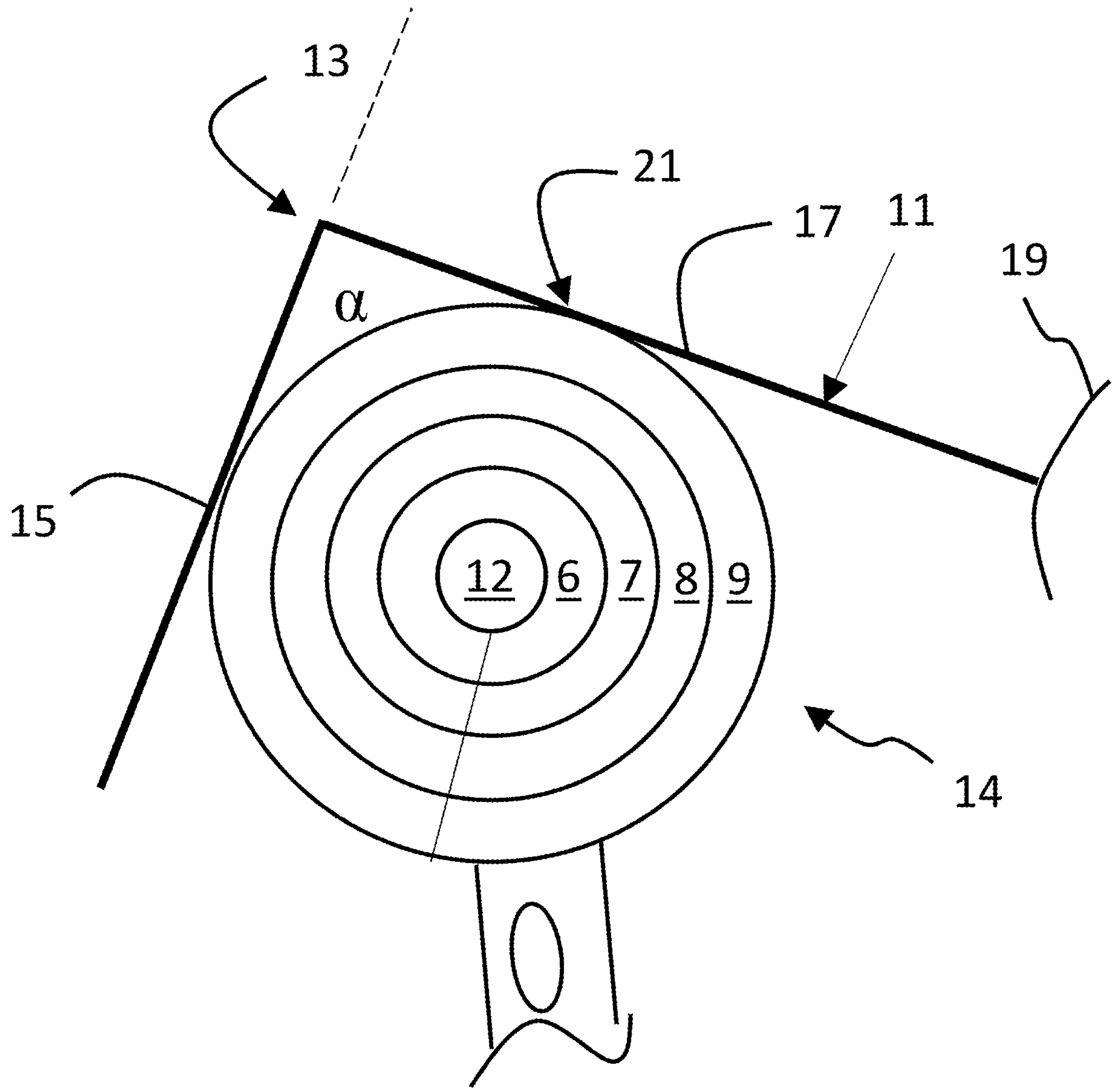
FIG. 12 illustrates how a knee may be placed on a support bar including an arrangement of pads for providing a first effective diameter for the support bar.

As may be seen in the embodiment of FIG. 12, a first pad layer 6, a second pad layer 7, a third pad layer 8, and fourth pad layer 9 are disposed around the support bar 12, thus providing a larger-diameter support surface. While a patient is supine one of the patient's legs may be positioned over the support bar 12 such that the support bar is disposed substantially behind the patient's knee 13 at the popliteal area. The patient's leg may then be hung over the support bar. In some embodiments, at least a portion of the weight of the patient's leg may be supported by lower leg support 32. The patient's lower leg, generally including the tibia 17 and foot 19, extends beyond the support bar 12. The support bar 12 thus serves as a fulcrum point 21 or area upon which the knee joint region of the leg may rest and the portion of the lower leg may pivot. The larger diameter support bar ensures that the support bar 12 provides a fulcrum point 21 farther away from the knee, thus allowing the knee joint to expand. With the leg disposed on the support bar 12, the physical therapist may allow gravity to pull the lower leg downward through a range of motion to help stretch the knee joint tissues. The lower leg may effectively serve as a lever, with the femur and patient's body weight at the knee side of the fulcrum point serving as an anchor weight. The gravity force serves to gently distract the knee joint, thus allowing the knee joint to separate and stretch substantially without creating compressive forces in the joint. The fulcrum placement may alter the mechanical advantage of the lever so as to selectively multiply the effect of gravity as the physical therapist manipulates the lower leg. A larger diameter may allow a physical therapist to treat a knee joint shortly after surgery, for example, and may allow for increased patient comfort even with substantial post-operative swelling. A larger diameter may effectively provide a larger surface area on which the patient's leg may rest, thus spreading the fulcrum pressures and correspondingly reducing patient discomfort. For self-applied regimes, a patient or patient caregiver may allow gravity to pull the lower leg downward through a range of motion to help stretch the knee joint tissues.

Voluntary knee contraction while the leg is so supported may be further applied to assist in strengthening the knee. In some therapy regimes, passive gravity-assisted stretching may be alternated with voluntary knee contraction. Further, in some embodiments, a lower leg support 32 may sometimes be used to support at least a portion of the weight of the patient's leg. The lower leg support may, for example, be used progressively less over the course of a therapy so that a decreasing proportion of the weight of the patient's leg is supported thereby.

Figure 13:
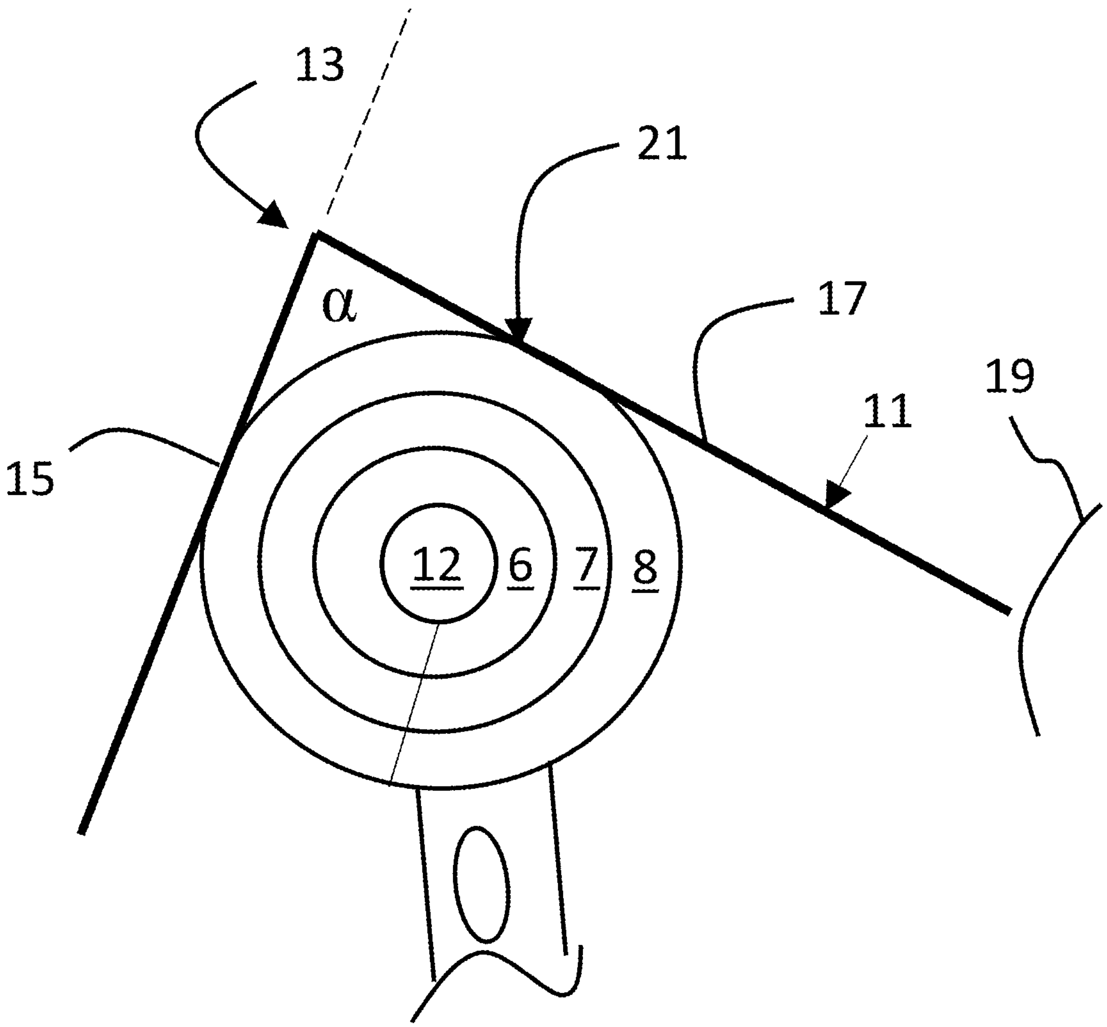
FIG. 13 illustrates how a knee may be placed on a support bar including an arrangement of pads for providing a second effective diameter for the support bar.

As the range of motion or flexibility and strength of the knee 13 increases over the course of the therapy regime, the fourth pad layer 9 may be removed from the support bar 12, thus reducing the effective diameter of the support bar, as may be seen in the embodiment of FIG. 13. For example, in some embodiments, strength in the knee 13 may be determined when the patient achieves a level of knee flexion without having any significant proportion of the patient's weight being supported using the lower leg support 32. The third pad layer 8 may thus support the knee 13 directly. The smaller effective diameter of the third pad layer 8 may allow for a more acute angle between the femur 15 and tibia 17 than the angle allowed by the fourth pad layer 9. The third pad layer 8 may allow the fulcrum point 21 to be closer to the knee joint, thus changing the mechanical advantage provided by the support bar and further multiplying the force generated by gravity or by physical therapist pressure 11.

Figure 14:
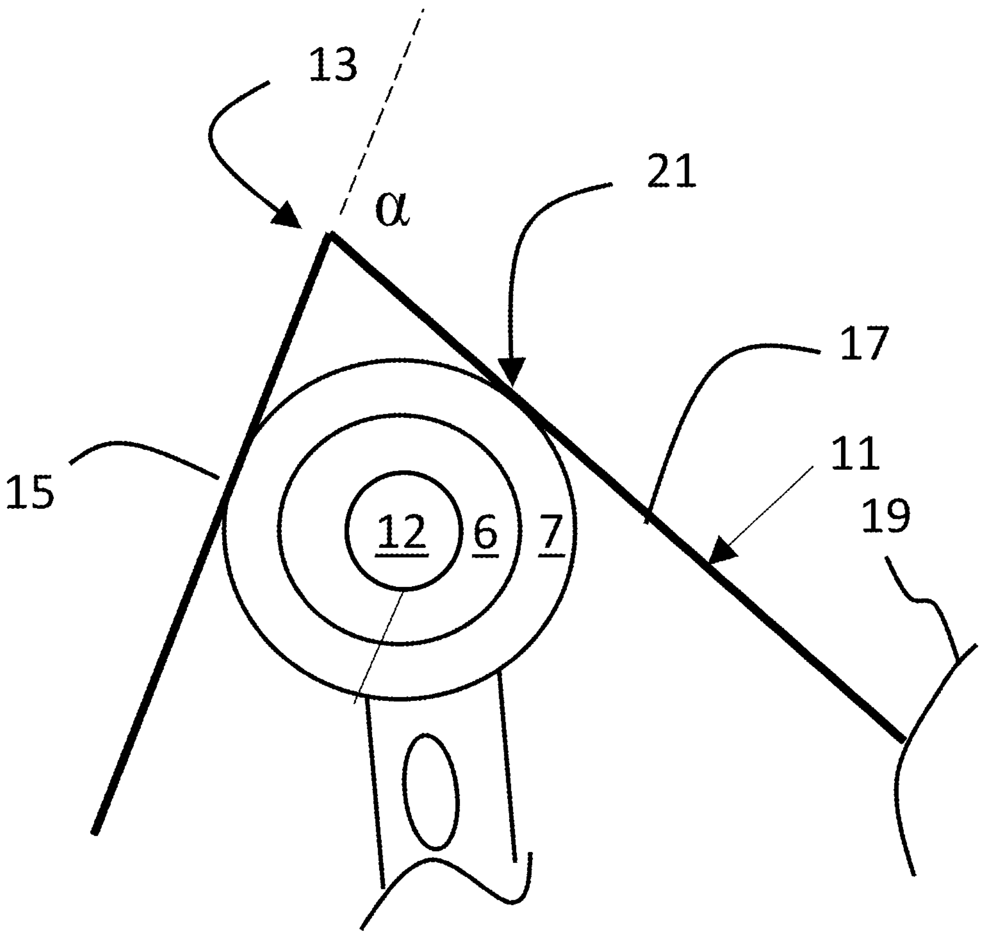
FIG. 14 illustrates how a knee may be placed on a support bar including an arrangement of pads for providing a third effective diameter for the support bar.

As the range of motion of the knee 13 further increases over the course of the therapy regime, the third pad layer 8 may be removed from the support bar 12, thus reducing the effective diameter of the support bar, as may be seen in the embodiment of FIG. 14. The second pad layer 7 may thus support the knee 13 directly. The smaller effective diameter of the second pad layer 7 may allow for a more acute angle between the femur 15 and tibia 17 than the angle allowed by the third pad layer 8. The second pad layer 7 may allow the fulcrum point 21 to be closer to the knee joint, thus changing the mechanical advantage provided by the support bar and further multiplying the force generated by gravity or by physical therapist pressure 11.

Figure 15:
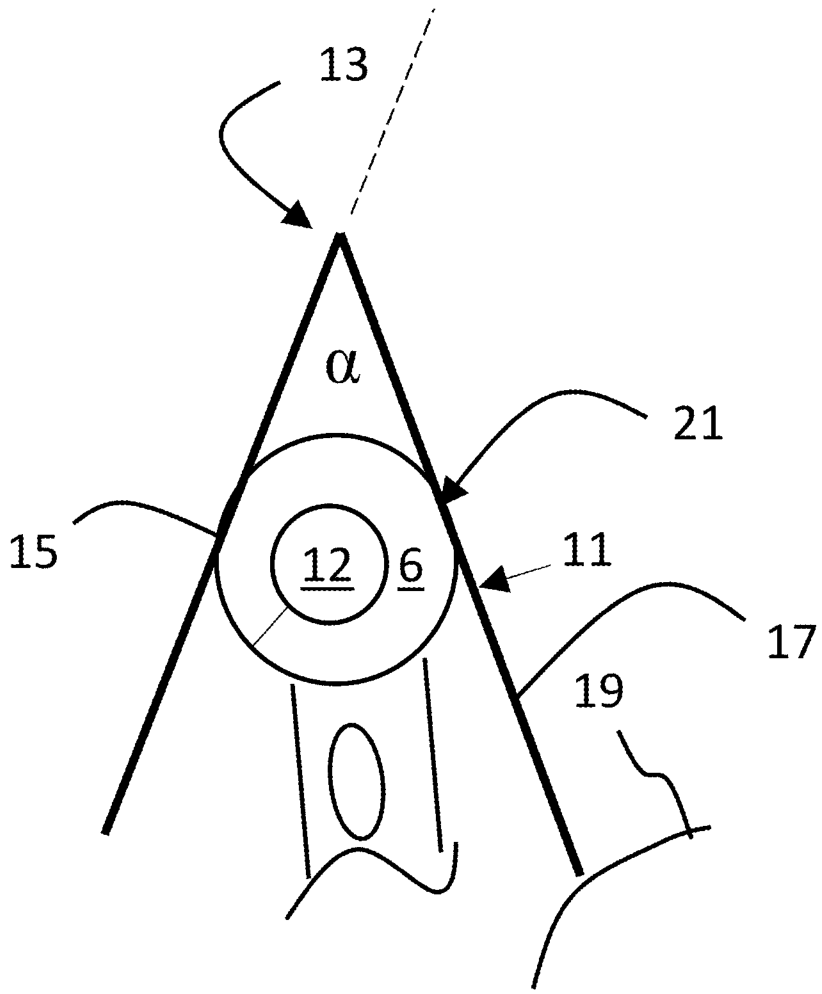
FIG. 15 illustrates how a knee may be placed on a support bar including an arrangement of pads for providing a fourth effective diameter for the support bar.

As the range of motion of the knee 13 still further increases over the course of the physical therapy regime, the second pad layer 7 may be removed from the support bar 12, thus reducing the effective diameter of the support bar, as may be seen in the embodiment of FIG. 15. The first pad layer 6 may thus support the knee 13 directly. The smaller effective diameter of the support bar 12 may allow for an even more acute angle between the femur 15 and tibia 17 than the angle allowed by the second pad layer 7. The first pad layer 6 may allow the fulcrum point 21 to be closer to the knee joint, thus changing the mechanical advantage provided by the support bar and yet further multiplying the force generated by gravity or by physical therapist pressure 11. Thus, by changing the effective diameter of the support bar, the physical therapist may effectively control the maximum flexion angle.

To transition between different levels of therapy, the patient may, for example, disengage from use of the device to allow for removal of the outermost pad mounted to the support bar. Once the outermost pad is removed (reducing the effective diameter of the support bar 12), the patient may then reposition their knee upon the support bar to complete transition from one level of therapy to another level of therapy. This may, for example, be done in two different therapeutic sessions. However, at least in some situations, a patient may transition between levels of therapy in a single therapeutic session. For example, following treatment using a support bar of one effective diameter a patient may get up and walk before returning to engage the support bar t at a reduced effective diameter. However, in some situations, it may be useful to transition a patient between levels of therapy without having the patient fully disengaging from the device.

For example, in some embodiments, a lower leg support 32 may sometimes be used to assist in transitioning a patient between different levels of therapy. For example, a patient may be treated with passive gravity-assisted stretching using a first effective diameter as described above. To transition to a next level of therapy. The lower leg support 32 may be moved to support at least a portion of the weight of the patient's leg. With at least a portion of the weight of the patient's leg supported, a caregiver may then slide an outermost pad out of engagement with the patient's knee. In this operation, the lower leg support 32 may function to help support the patient's leg during transition between the two levels of therapy. In this way, transition between levels of therapy may be made more comfortably without having the patient completely disengage from the device. Alternatively, the patient may fully disengage from a device, but when they first reengage the device at a new level of flexion, a lower leg support 32 may be used to support a weight of the patient's leg. In either case, at least the patient's first encounter with a new therapeutic level may make use of the lower leg support 32. The position of the lower leg support 32 may then be adjusted to slowly ease the patient's knee into proper engagement with the support bar. For example, a patient or caregiver may slowly adjust the angular position of the lower leg support 32 so that the lower leg support slowly disengages fully or in part from the patient's leg thereby gently transitioning the patient to the next level of therapy.

In some embodiments, disengagement of the patient's leg with the lower leg support 32 may be execute using a predetermined routine. For example, the one or more actuators 50, 52 may receive a control signal so that the angle between the lower leg support 32 and the height-adjustment bar 22 may change at a predetermined rate or following some predetermined pattern defined in a routine. For example, in one routine, the lower leg support 32 may disengage from supporting the patient's leg by changing its angular position at a rate, as may be expressed in degrees per minute. In some embodiments, a rate of disengagement between the lower leg support 32 may be controlled using feedback from sensor data. For example, the lower leg support 32 may disengage from the patient's leg slowly so that the weight of the patient's leg supported thereby changes in a controlled manner based on a signal received by one or more of the sensors 70. A rate of disengagement may then be calibrated or measured in units of pounds of force per minute, for example. Disengagement of the lower leg support 32 from the patient's leg may sometimes be set to provide only partial disengagement from the patient's leg. For example, the lower leg support 32 may disengage from the patient until a threshold pressure or force is measured by one or more of the sensors 70.

Figure 16:
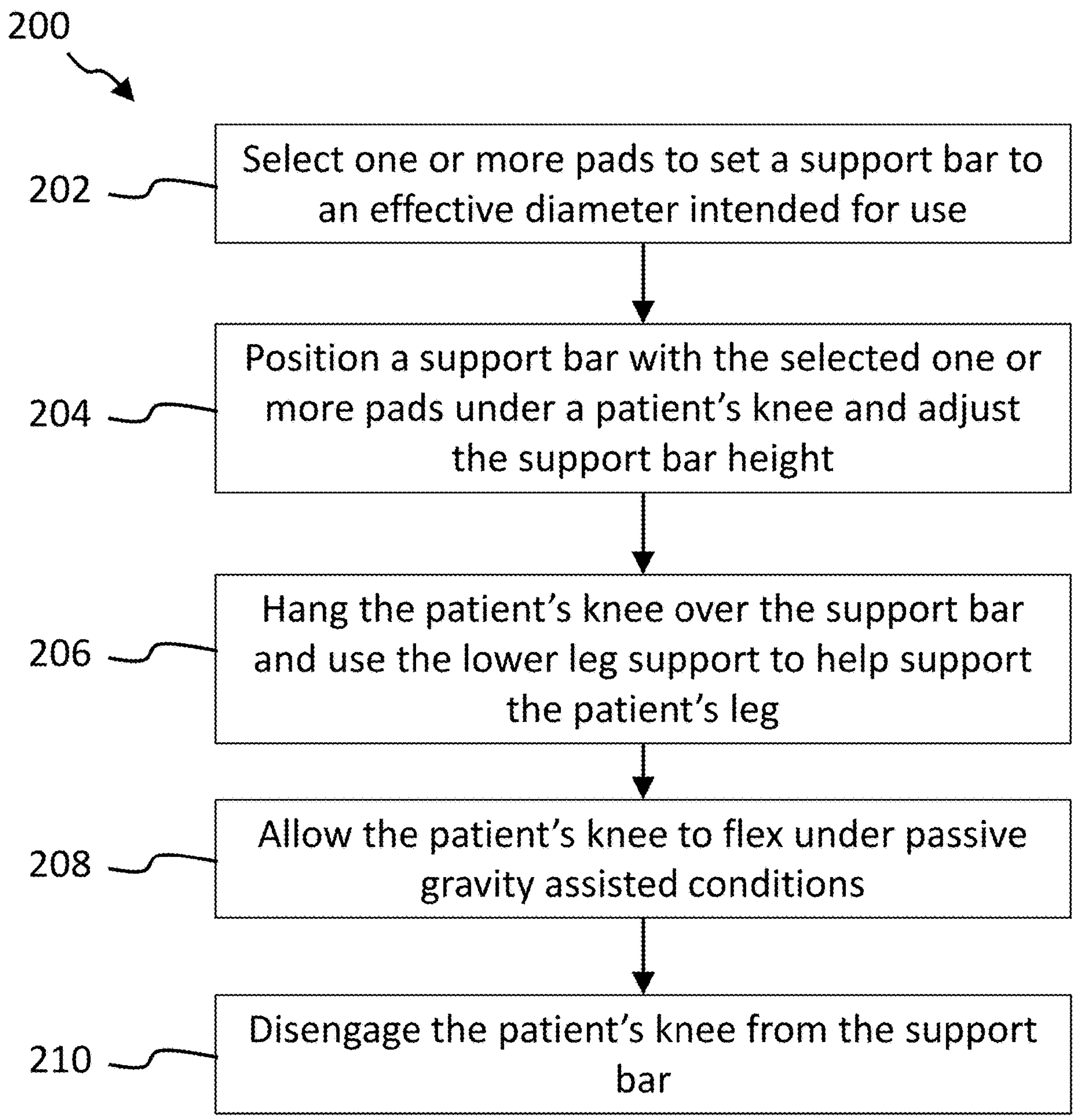
FIG. 16 is a flowchart of one embodiment of a method for knee joint rehabilitation using a knee joint flexion device or apparatus.

FIG. 16 shows an embodiment of a method 200 for rehabilitation of a patient's knee joint using a knee joint flexion device or apparatus. As shown in step 202, a pad or set of pads useful for providing a desired effective diameter of a support bar 12 may be selected. For example, in some therapy sessions, one or more pads for achieving an effective diameter of a support bar may be prescribed by a physical therapist, doctor, or other qualified individual as may be appropriate for a patient at a particular stage in a therapeutic regimen. At step 204, a support bar 12 (e.g., a support bar having an appropriate diameter pad or number of nested pads to achieve the intended certain effective diameter) may be positioned under the knee. The support bar 12 may be disposed at the popliteal area of a knee joint while the patient is lying on their back in a supine position. The support bar 12 may then be adjusted as may be needed to provide a height to permit the lower leg to hang over the support bar such that a patient's foot does not rest on the surface upon which the therapy session is being performed. In some embodiments, lower leg support 32 may further be adjusted to a position so that it is ready to receive a leg of the patient when the patient's knee is hung over the support bar 12.

At step 206, the patient's knee may be hung over the support bar 12. This may, for example, be accomplished by the patient with or without the assistance of a caregiver. The lower leg support 32 may be used to gradually ease the patient into engagement with the support bar 12. For example, in some embodiments, the patient's knee may be hung over the support bar 12 and allowed to immerse into one or more pads among the system of pads 14. Once the patient's knee has, fully or at least in part, settled onto the padded support bar 12, the lower leg support 32 may be brought into engagement with the patient's leg. For example, in some embodiments, it may be useful for a caregiver to guide the patient's knee so that it is properly seated on the support bar 12 in a suitable position for gravity assisted flexion before the lower leg support 32 is moved into engagement. This initial positioning may involve allowing the patient's knee to at least in part become immersed into the padded support bar 12. Once this position is established, the lower leg support 32 may be moved into a position for engagement with the lower part of the patient's leg. A caregiver may help to support or guide the patient's leg during initial engagement of the patient's knee with the support bar 12 as well as during initial engagement of the patient's lower leg with the lower leg support 32. The caregiver may further take care to ensure that engagement of the patient's leg with the lower leg support 32 does not inadvertently cause the patient to shift the position of the patient's knee on the support bar so that it is no longer in a desired position for passive gravity assisted flexion.

In some embodiments, engagement between the lower leg support 32 and the patient's leg may generally be made together with or at about the same time as when the patient's knee is hung over the support bar 12. Thus, advantageously, the lower leg support may be used to help relieve stress on the patient's knee during an initial time period when the patient is first engaging with the device and when the patient may experience discomfort with the procedure. An initial level of engagement between the patient's leg and the lower leg support 32 may be established in various ways. For example, in some embodiments, the lower leg support 32 may be adjusted until visual identification is made of engagement between the posterior side of the patient's lower leg and the lower leg support. In other examples, the lower leg support 32 may be brought to a preselected initial position (e.g., a position established or read using a goniometer or angle guide), such as may be specified by a doctor or other caregiver. In other embodiments, the lower leg support 32 may be adjusted to an initial position established using collected sensor data provided from one or more of the sensors 70*a*, 70*b*, and 70*c*.

Still referring to step 206, the lower leg support 32 may be moved from its initial position to a second position wherein it is substantially disengaged from the patient's leg. For example, in one embodiment, the lower leg support 32 may be adjusted from an engaged to a fully disengaged position over a first time period. Thus, the patient's leg may be significantly supported by the lower leg support 32 during the initial setup or first time period described above. However, during a second time, describe below in relation to step 208, the patient's leg may flex under passive gravity assisted conditions without being significantly support by the lower leg support 32. In one example, the patient may actively control the position of the lower leg support 32 during the first time period. For example, as shown in FIG. 18, the patient may use a handheld controller to slowly disengage the lower leg support 32 from the treated leg. In another example, the lower leg support 32 may be controlled to automatically disengage from the patient's leg. For example, one or more of the actuators 50, 52 may be controlled using a predetermined routine suitable for slowly disengaging the lower leg support 32 from the patient's leg. In some of those embodiments, disengagement of the lower leg support 32 from the patient's leg may be guided or controlled using sensor data collected using one or more of the sensors 70*a*, 70*b*, and 70*c*.

At step 208, the patient may allow their knee to flex under passive gravity assisted conditions for a second period of time. In some regimens, a caregiver may further prescribe that the patient engage in some other exercise during the second time period, such as leg extensions, for example. In the step 210, the patient may disengage from the support bar. For some patient's, disengagement from the support bar may include adjusting the lower leg support 32 to reduce pressure on the patient's knee. For example, the lower leg support 32 may be engaged or reengaged with the patient's leg to take pressure off the knee joint. This may, for example, make it easier for a patient to dismount a knee joint flexion device. Alternatively, the lower leg support 32 may be moved to a position wherein it may help to support the patient's leg making it easier for a caregiver to exchange, add, or remove one or more pads from the support bar 12. For example, the lower leg support 32 may be adjusted to a position wherein a physical therapist may more easily exchange one pad for another or remove a pad from a group of pads so as to continue treatment of the patient with a support bar 12 with a different effective diameter.

Figure 17:
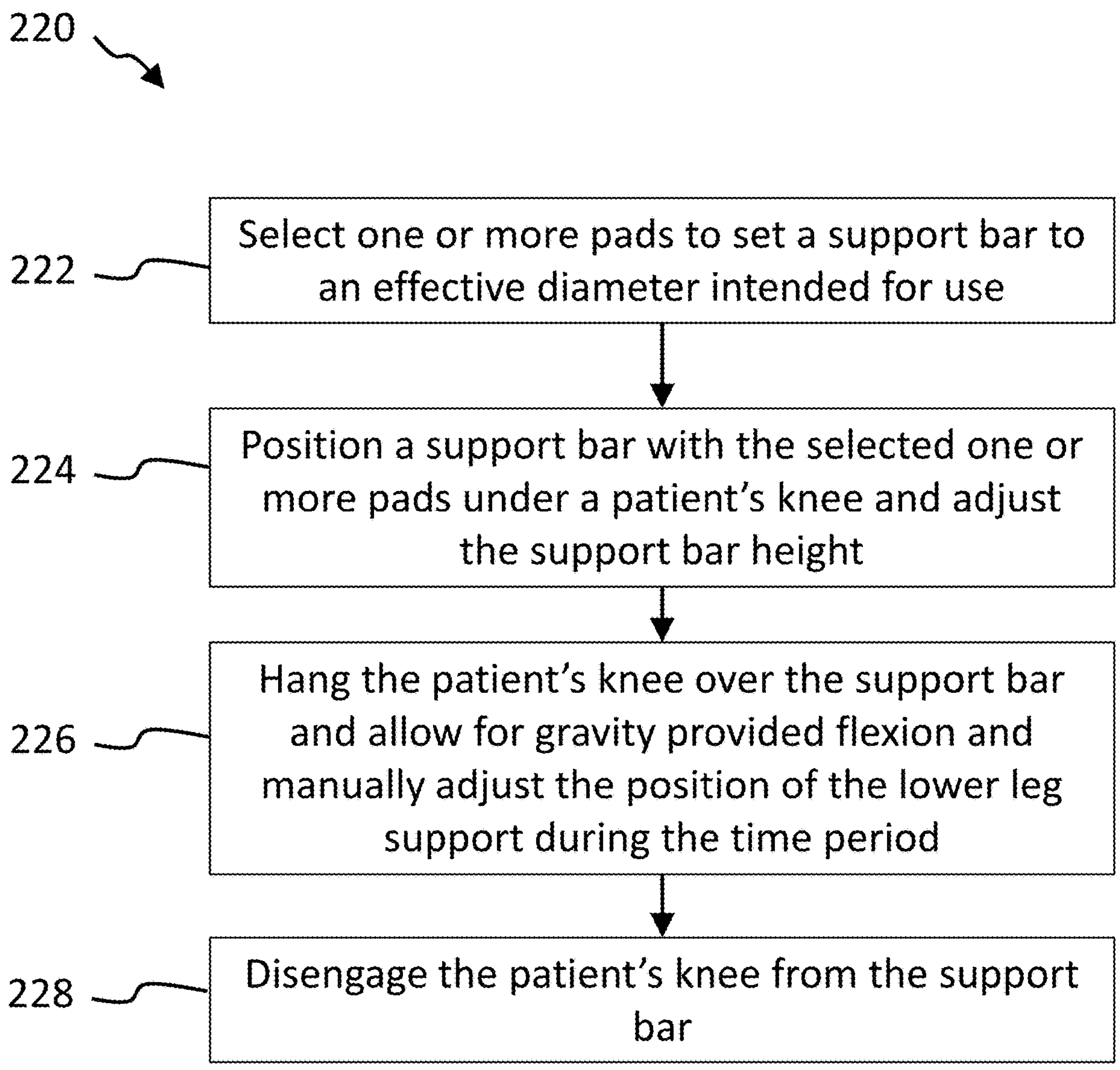
FIG. 17 is a flowchart of another embodiment of a method for knee joint rehabilitation using a knee joint flexion device or apparatus wherein a patient manually controls the position of a lower leg support during a therapeutic time period.

FIG. 17 shows another embodiment of a method 220 for rehabilitation of a patient's knee joint using a knee joint flexion device or apparatus. As similarly explained above in relation to method 200, in step 222, a pad or set of pads useful for providing a desired effective diameter for a support bar 12 may be selected. At step 224, the support bar 12 may be positioned under the knee. The support bar 12 may be disposed at the popliteal area of a knee joint and adjusted as may be needed to provide a height to permit the lower leg to hang over the support bar such that a patient's foot does not rest on the surface upon which the therapy session is being performed. In some embodiments, lower leg support 32 may further be adjusted to a position so that it is ready to receive a leg of the patient when the patient's knee is hung over the support bar 12.

At step 226, the patient's knee may be hung over the support bar 12. This may be accomplished by the patient alone or with assistance of a caregiver depending, for example, on the strength of the patient's knee. In some embodiments, the patient's knee may be hung over the support bar 12 and allowed to immerse into one or more pads among the system of pads 14. Once the patient's knee has, fully or at least in part, settled onto the padded support bar 12, the lower leg support 32 may be brought into engagement with the patient's leg. Thus, the patient's leg may hang over the support bar with at least a portion of the weight of the patient's leg being supported by the lower leg support 32.

The patient's leg may be allowed to naturally extend under conditions of passive gravity assisted flexion. A portion of the weight of the patient's leg may be supported by the lower leg support. As shown in FIG. 18, the patient may be provided with a controller 60 so that they may manually adjust the position of the lower leg support 32 to achieve a reasonable level of comfort as gravity works on the knee to slowly allow the knee joint to expand. In another embodiment, a knee joint flexion device may include a mechanical lever coupled to the lower leg support 32. The mechanical lever may be sized in length so that a user may control the position of the lower leg support 32 from a supine position. Thus, in the embodiment of method 220, the patient may control the lower leg support 32 actively during the therapeutic stage of gravity induced flexion. In some of those embodiments, data may be collected from one or more of the sensors 70*a*, 70*b*, 70*c*, and 71 and made available for review by an attending doctor, physical therapist, or other caregiver. For example, a caregiver may receive data to understand when the patient may achieve a level of flexion without relying significantly on the lower leg support 32. This may, for example, be evaluated as one indication that the patient may be ready for a next stage in flexion therapy.

As shown at step 228, the patient may disengage from the support bar. For some patient's, disengagement from the support bar may include adjusting the lower leg support 32 to reduce pressure on the patient's knee to assist the patient in fully or partially disengaging from the device. For example, the support bar 12 may be raised to help support the patient's knee when the patient is dismounts to fully disengage from the device. In another example, the patient may only partially disengage from the device. For example, the lower leg support 32 may be adjusted to a position wherein a physical therapist may more easily exchange one pad for another or remove a pad from a group of pads to change the effective diameter of the support bar.

Figure 19:
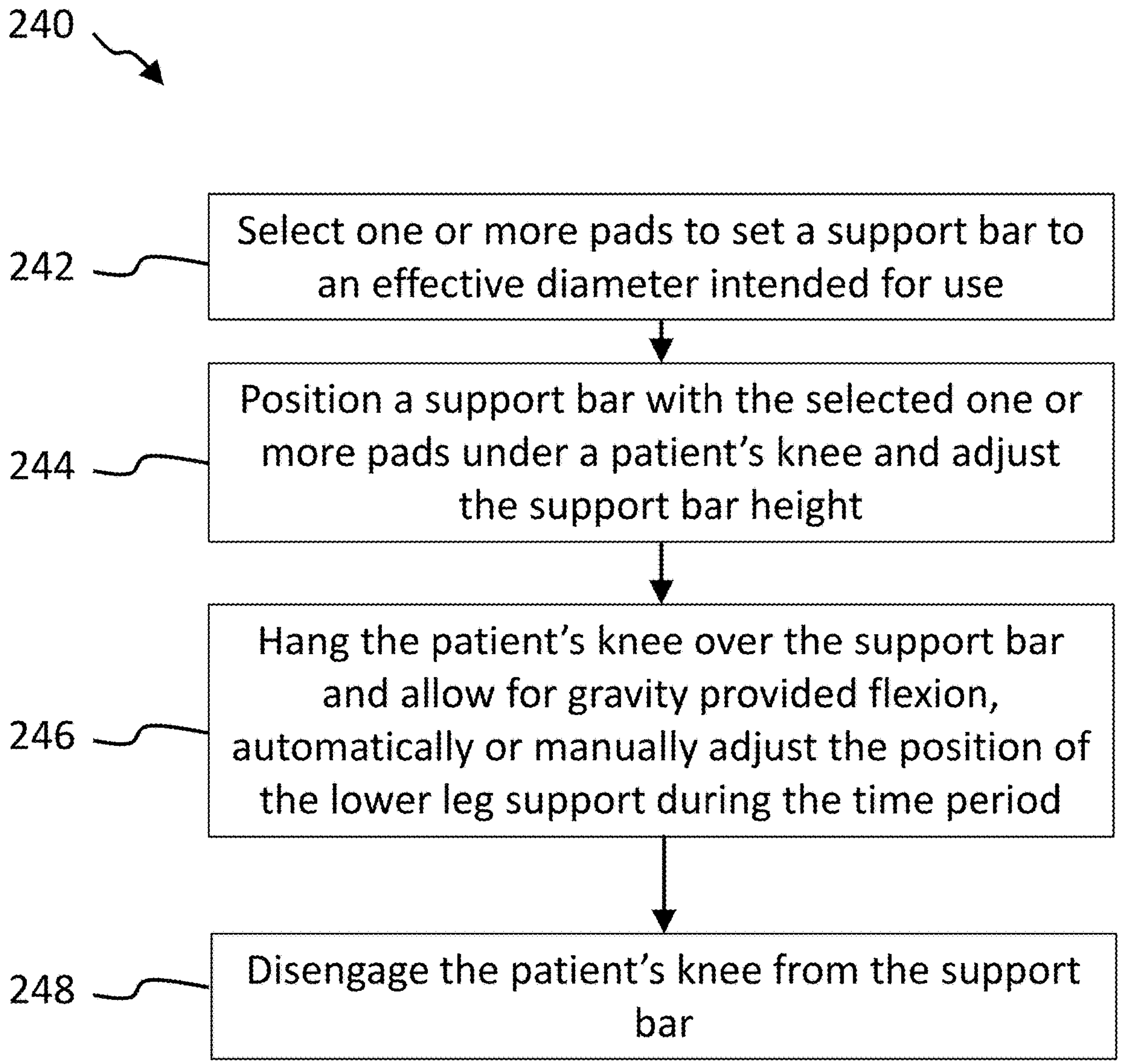
FIG. 19 is a flowchart of another embodiment of a method for knee joint rehabilitation using a knee joint flexion device or apparatus wherein a position of a lower leg support is adjusted during a therapeutic time period.

FIG. 19 shows another embodiment of a method 240 for rehabilitation of a patient's knee joint using a knee joint flexion device or apparatus. As shown in step 242, a pad or set of pads useful for providing a desired effective diameter of a support bar 12 may be selected. At step 244, a support bar 12 may be positioned under the knee and adjusted as may be needed to provide a height to permit the lower leg to hang over the support bar such that a patient's foot does not rest on the surface upon which the therapy session is being performed. Lower leg support 32 may further be adjusted to a position so that it is ready to receive a leg of the patient when the patient's knee is hung over the support bar 12.

At step 246, the patient's knee may be hung over the support bar 12. For example, the patient's knee may be hung over the support bar 12 and allowed to immerse into the padded support bar 12. Once the patient's knee has, at least in part, settled onto the padded support bar 12, the lower leg support 32 may be brought into engagement with the patient's leg. Thus, the patient's leg may hang over the support bar 12 with at least a portion of the weight of the patient's leg being supported by the lower leg support 32. In this embodiment, the position of the lower leg support 32 may be automatically adjusted during gravity assisted flexion. For example, in one embodiment, the lower leg support 32 may be set at an initial level of engagement with the patient's leg, such as may, for example, be accomplished when a user visually establishes engagement, by setting the support to a desired goniometer position, or using sensor data to provide an indication of desired level of support. At periodic intervals, the lower leg support 32 may then be automatically or manually adjusted. For example, the lower leg support 32 may be controlled using a preselected routine to slowly decrease a level of engagement with the patient's leg. In some embodiments, the lower leg support 32 may be controlled using a preselected routine to provide alternating levels of support. For example, during some times during a therapeutic session, the lower leg support 32 may be adjusted so as to slowly decrease a level of engagement or to fully disengage from the patient's leg. However, at other times the lower leg support 32 may be moved into a position wherein engagement with the patient's leg is greater (e.g., a greater proportion of the weight of the patient's leg may be supported by the lower leg support). Such embodiments may be useful because pressure on the patient's knee may be periodically reduced during a therapeutic session, which may allow some patient's to be treated for increased periods of time.

As shown at step 248, the patient may disengage from the support bar. For some patient's, disengagement from the support bar may include adjusting the lower leg support 32 to reduce pressure on the patient's knee to assist the patient in fully or partially disengaging from the device. For example, the support bar 12 may be raised to help support the patient's knee when the patient is dismounts to fully disengage from the device. In another example, the patient may only partially disengage from the device. For example, the lower leg support 32 may be adjusted to a position wherein a physical therapist may more easily exchange one pad for another or remove a pad from a group of pads to change the effective diameter of the support bar.

Figure 21:
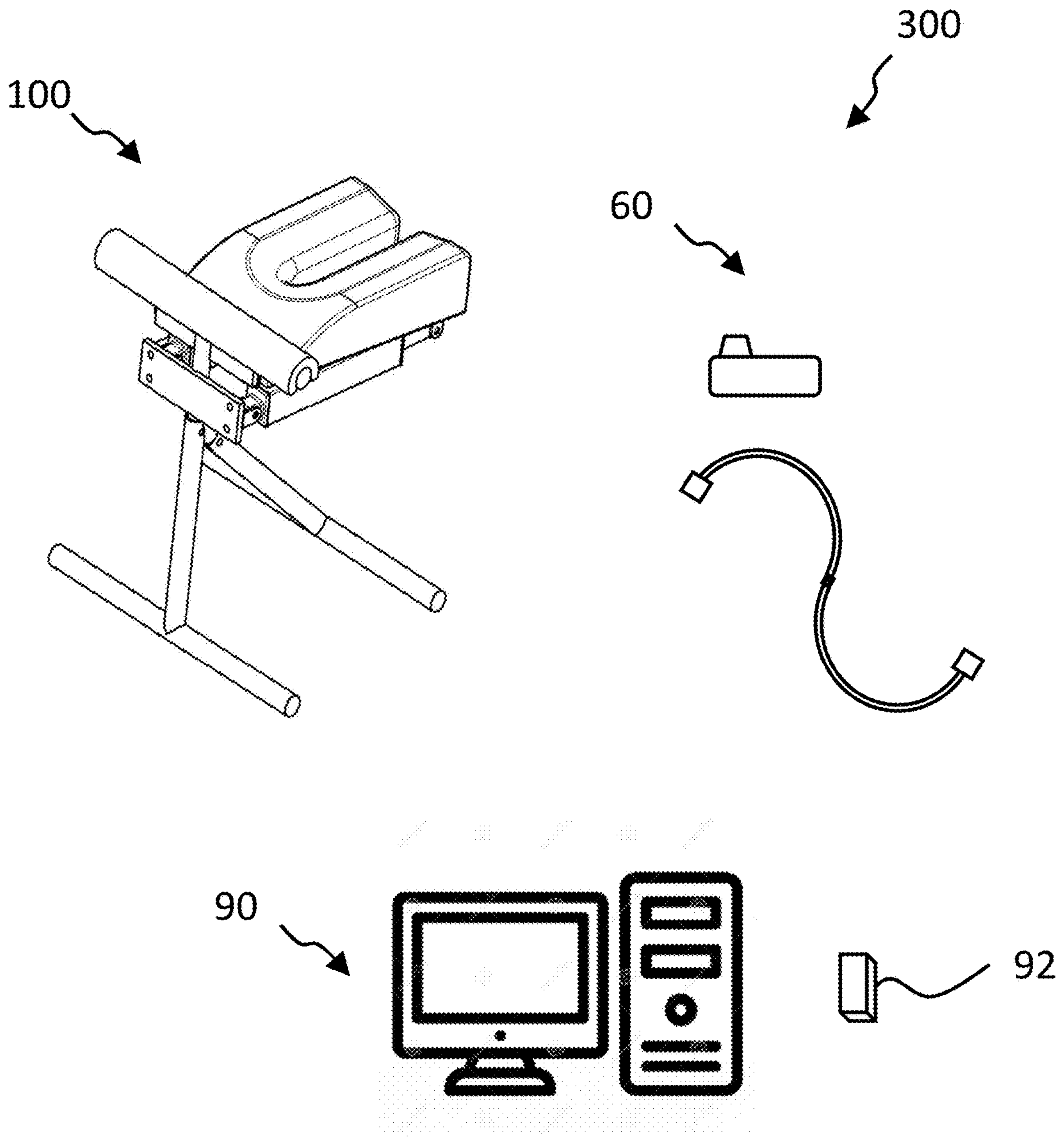
FIG. 21 shows a knee joint flexion device or apparatus included as part of a knee joint rehabilitation system.

In some embodiments, as shown in FIG. 21 a knee joint rehabilitation system may include a knee joint flexion device (such as the knee joint flexion device or apparatus 100 in the embodiment shown). The system 300 may further include a controller 60, such as may be provided with a wired connection for coupling to the device 100. The system may be provided with or otherwise used with a computer system 90. The computer system may, for example, comprise a desktop computer programmed using one or more tangible computer media 92. A controller including an integrated processor or separate computer may be configured for downloading of an application or program useful for controlling the position of a lower leg support 32 through actuation of one or more actuators.

A knee joint flexion device, system, and related methods are described. The devices, systems, and methods are described herein. In some of those embodiments, reference may be made to a patient, such as an individual who is recovering from a knee joint injury. However, the devices, systems, and methods may, in some embodiments, be used or executed by an individual using a device or system herein for maintaining flexibility of the knee joint.

Figure 22:
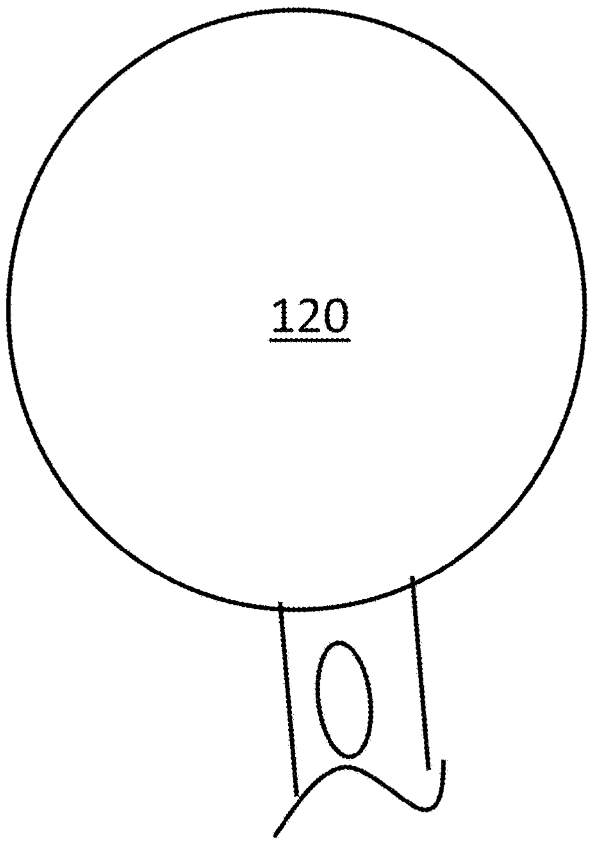
FIG. 22 shows an embodiment of a support bar having a first effective diameter coupled to a height-adjustment bar.
Figure 23:
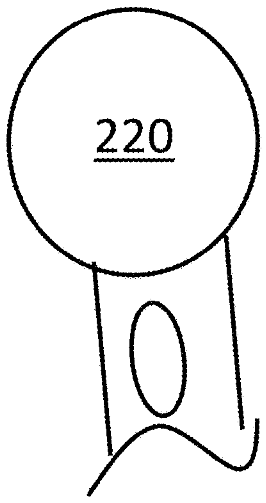
FIG. 23 shows an embodiment of a support bar having a second effective diameter coupled to a height-adjustment bar.

As described herein, a knee joint flexion device 10, 100, 150 may include a system of pads configured for nesting inside one another and mounting to a support bar to adjust the effective diameter of the support bar and control the angle about which a patient's knee may bend. Alternatively, a plurality of support bars and/or height-adjustment bars may be used to provide different support bar effective diameters. For example, as shown in FIGS. 22 and 23 supports bars 120, 220 with different effective diameters could be used as an alternative to a system of pads configured for nesting inside one another and mounting to a support bar to adjust the effective diameter of the support bar. The support bars 120, 220 may, for example, be removably mounted to a height-adjustment bar so as to provide different effective diameters used in a treatment regimen. Alternatively, a plurality of different height-adjustment bars, each with a different support bar 120, 220 connected thereto could be used to provided different effective diameters for use in a treatment regimen.

Although the disclosed subject matter and its advantages have been described in detail, it should be understood that various changes, substitutions and alterations can be made herein without departing from the subject matter as defined by the appended claims. Moreover, the scope of the present application is not intended to be limited to the particular embodiments of the process, machine, manufacture, composition, or matter, means, methods and steps described in the specification. Among other things, any feature described for one embodiment may be used in any other embodiment, and any feature described herein may be used independently or in combination with other features. For example, certain embodiments herein may describe use of sensors and angle guides (or goniometers). Unless the context clearly dictates otherwise, those components may be used in any of the different devices described herein. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, systems or steps.

What is claimed is:

1. A knee joint rehabilitation system comprising:

a knee joint flexion device, comprising:

- a support bar fixedly connected to a height-adjustment bar or configured for removable coupling to said height-adjustment bar, the support bar being further configured for receiving at least one of a plurality of pads so as to provide a padded support bar, the padded support bar being configured to receive a knee joint posterior;
- said plurality of pads configured to removably mount to the support bar to adjust an effective outer diameter of the support bar;
- a lower leg support connected to the height-adjustment bar using a first joint so as to allow for changes in an angular position between said lower leg support and said height-adjustment bar when the position of the lower leg support is adjusted;
- a goniometer configured for indicating the angular position of said lower leg support; and
- an actuator configured for extension and retraction so as to adjust the angular position between said lower leg support and said height-adjustment bar, said actuator including a first end and a second end, said actuator being connected to the lower leg support at said first end using a first hinge and connected to the height-adjustment bar at said second end using a second hinge.

2. The knee joint rehabilitation system of claim 1 said goniometer comprising markings disposed on a rod slidably engaged with a sleeve, the goniometer configured so that said user can identify a position of the markings with respect to the sleeve and manually record said position of the lower leg support.

3. The knee joint rehabilitation system of claim 1 said goniometer comprising an electromechanical goniometer configured for providing an electrical signal corresponding to said position of said lower leg support.

4. The knee joint rehabilitation system of claim 1 the lower leg support comprising a top surface shaped to receive a posterior portion of a leg of a user, the lower leg support being contoured to receive a calf muscle of the user.

5. The knee joint rehabilitation system of claim 4, the lower leg support comprising a first groove and a second groove, said lower leg support increases in thickness along a portion of its length.

6. The knee joint rehabilitation system of claim 5, said lower leg support comprising a first group of one or more sensors and a second group of one or more sensors;

said first group of one or more sensors being disposed on said first groove; and said second group of one or more sensors being disposed on said second groove.

7. The knee joint rehabilitation system of claim 6, said lower leg support being configured so that the posterior portion of the leg of said user contacts said first group of one or more sensors at a first angular position of the lower leg support and is urged towards said second group of one or more sensors at a second angular position of the lower leg support.

8. The knee joint rehabilitation system of claim 1 further comprising:

a controller configured for controlling extension and retraction of said actuator when adjusting the position of said lower leg support.

9. The knee joint rehabilitation system of claim 8, said controller configured for handheld control and including a switch or button for controlling said angular position between said lower leg support and said height-adjustment bar.

10. The knee joint rehabilitation system of claim 8 wherein said controller is configured for executing one or more preselected routines for controlling said angular position between said lower leg support and said height-adjustment bar.

11. A knee joint rehabilitation system comprising:

a knee joint flexion device, comprising:

a tubular strut having a first support foot and a bracket attached thereto or configured for attachment to the tubular strut, the tubular strut forming a first aperture;

a height-adjustment bar configured to be translatably disposed in the tubular strut when coupled thereto, the height-adjustment bar forming a plurality of second apertures extending through a diameter of the height-adjustment bar;

a support bar fixedly connected substantially perpendicularly to the height-adjustment bar, the support bar being configured for receiving at least one of a plurality of pads so as to provide a padded support bar, the padded support bar being configured to receive a knee joint posterior;

said plurality of pads being configured to removably mount to the support bar, each pad having an outer diameter different from that of another of said plurality of pads;

a support strut pivotably connected to the bracket when the knee joint flexion device is in an assembled form, the support strut having a second support foot attached thereto, the support strut pivotable away from parallel the tubular strut to form an angle thereto;

a pin configured for removable positioning in one of the plurality of second apertures to fix the height-adjustment bar against translation;

a lower leg support connected to the height-adjustment bar using a first joint so as to allow for changes in an angular position between said lower leg support and said height-adjustment bar when the position of the lower leg support is adjusted; and a first actuator including a first end and a second end, said actuator being pivotably connected to the lower leg support at said first end and pivotably connected to the height-adjustment bar at said second end.

12. The system of claim 11 further comprising a goniometer configured for indicating a position of said lower leg support.

13. The system of claim 11 wherein the lower leg support comprises a surface shaped to receive a posterior portion of a leg of a user and to accommodate for changes in positioning of the leg of the user for different angles of the lower leg support.

14. The system of claim 11, the lower leg support comprising a support pack or panel comprising a first groove configured for receiving a posterior portion of a patient's lower leg, said lower leg support increasing in thickness along a portion of its length extending from a first end to a second end, the lower leg support comprising a second groove.

15. The system of claim 14 further comprising:

a first group of one or more sensors disposed on the lower leg support within said first groove; and a second group of one or more sensors disposed on the lower leg support within said second groove.

16. The system of claim 11, further comprising a controller configured for handheld control by a user, the controller including a switch or button for controlling said angular position between said lower leg support and said height-adjustment bar.

17. The system of claim 11, further comprising a controller being configured for executing one or more preselected routines for controlling said angular position between said lower leg support and said height-adjustment bar.

18. A knee joint rehabilitation system comprising:

a height-adjustment bar;

a plurality of support bars, each support bar among the plurality of support bar being configured for removable coupling to the height-adjustment bar, each of the support bars being configured to receive a knee joint posterior;

the plurality of support bars being configured for providing different effective diameters when individual support bars among the plurality of support bars are mounted to the height-adjustment bar; and a lower leg support connected to the height-adjustment bar using a first joint or configured for connection thereto using said first joint so as to allow for changes in an angular position between said lower leg support and said height-adjustment bar when the position of the lower leg support is adjusted;

an actuator configured for extension and retraction so as to adjust the position of said lower leg support, the actuator including a first end and a second end, the actuator being pivotably connected to the lower leg support at said first end and pivotably connected to the height-adjustment bar at said second end.

19. The knee joint rehabilitation system of claim 18, said lower leg support comprising a first group of one or more sensors and a second group of one or more sensors;

said first group of one or more sensors being disposed on said first groove; and said second group of one or more sensors being disposed on said second groove.

20. The knee joint rehabilitation system of claim 19, said lower leg support being configured so that the posterior portion of said patient's leg contacts said first group of one or more sensors at a first angular position of the lower leg support and is urged towards said second group of one or more sensors at a second angular position of the lower leg support.

* * * * *